United States Patent
Peurach et al.

[11] Patent Number: 5,844,392
[45] Date of Patent: Dec. 1, 1998

[54] HAPTIC BROWSING

[75] Inventors: Thomas M. Peurach, Novi; Douglas Haanpaa, Ann Arbor; Todd Yocum, Ann Arbor; Charles J. Jacobus, Ann Arbor, all of Mich.

[73] Assignee: Cybernet Systems Corporation, Ann Arbor, Mich.

[21] Appl. No.: 861,080

[22] Filed: May 21, 1997

Related U.S. Application Data

[63] Continuation of Ser. No. 854,375, May 12, 1997, Pat. No. 5,831,408, which is a continuation of Ser. No. 543,606, Oct. 16, 1995, Pat. No. 5,629,594, which is a continuation-in-part of Ser. No. 257,070, Jun. 9, 1994, Pat. No. 5,459,382, which is a division of Ser. No. 984,324, Dec. 2, 1992, Pat. No. 5,389,865.

Related U.S. Application Data

[60] Provisional application No. 60/018,036, May 21, 1996.
[51] Int. Cl.$^6$ .................................................. G05B 13/02
[52] U.S. Cl. .............. 318/568.17; 318/561; 318/568.11; 345/156; 434/365; 901/9
[58] Field of Search .................................. 318/560–696; 395/93, 99, 156, 124, 159, 127, 154, 161, 155; 901/9; 345/173, 156, 161, 420, 179; 434/365, 11, 255, 247; 463/38, 30, 36–43; 482/4, 902, 8, 900; 128/779, 774; 364/559, 560, 474.03, 474.37, 551.02, 190, 461

[56] References Cited

U.S. PATENT DOCUMENTS

| | | | |
|---|---|---|---|
| 4,604,016 | 8/1986 | Joyce | 414/7 |
| 4,795,296 | 1/1989 | Jau | 414/5 |
| 4,982,918 | 1/1991 | Kaye | 244/223 |
| 5,004,391 | 4/1991 | Burdea | 414/6 |
| 5,007,300 | 4/1991 | Siva | 74/471 XY |
| 5,018,922 | 5/1991 | Yoshinada et al. | 414/5 |
| 5,044,956 | 9/1991 | Behensky et al. | 434/45 |
| 5,062,594 | 11/1991 | Repperger | 244/175 |
| 5,116,180 | 5/1992 | Fung et al. | 414/5 |
| 5,142,931 | 9/1992 | Menahem | 74/471 XY |
| 5,143,505 | 9/1992 | Burdea et al. | 414/5 |
| 5,180,351 | 1/1993 | Ehrenfried | 482/52 |
| 5,185,561 | 2/1993 | Good et al. | 318/432 |
| 5,264,768 | 11/1993 | Gregory et al. | 318/561 |
| 5,382,885 | 1/1995 | Salcudean et al. | 318/568.11 |
| 5,389,865 | 2/1995 | Jacobus et al. | 318/568.11 |

(List continued on next page.)

OTHER PUBLICATIONS

Adachi, Y., "Touch & Trace on the Free–Form Surface of Virtual Object", Proceedings of IEEE Virtual Reality Annual International Symposium (Sep. 18–22, 1993, Seattle WA) pp. 162–168.

Hannaford, Blake et al., "Performance Evaluation of a Six–Axis Generalized Force–Reflecting Teleoperator", IEEE May/Jun. 1991, vol. 21, No. 3, pp. 620–633.

Iwata, Hiroo et al., "Volume Haptization", IEEE 1993, pp. 16–18.

(List continued on next page.)

*Primary Examiner*—Paul Ip
*Attorney, Agent, or Firm*—Gifford, Krass, Groh, Sprinkle, Patmore, Anderson & Citkowski

[57] ABSTRACT

A method of browsing geometrical databases through touch or haptic feedback is disclosed which presents a tactile virtual reality to a user, facilitating the simultaneous browsing, or viewing, touching, attaching to, or manipulation of object descriptions contained within files both visually and haptically. The files may be local to a computer system or located across a network on one or more computer systems. In a preferred embodiment, the invention preferably renders haptic features using a layered architecture to support multiple axes per device, multiple devices per servo layer, multiple servo layers per communications layer, and multiple applications accessing common or different force-feedback devices.

20 Claims, 29 Drawing Sheets

U.S. PATENT DOCUMENTS

| | | | |
|---|---|---|---|
| 5,451,924 | 9/1995 | Massimino et al. | 340/407.1 |
| 5,459,382 | 10/1995 | Jacobus et al. | 318/568.11 |
| 5,506,605 | 4/1996 | Paley | 345/163 |
| 5,562,572 | 10/1996 | Carmein | 482/4 |
| 5,576,727 | 11/1996 | Rosenberg et al. | 345/179 |
| 5,583,478 | 12/1996 | Renzi | 340/407.1 |
| 5,587,937 | 12/1996 | Massie | 364/578 |
| 5,588,139 | 12/1996 | Lanier et al. | |
| 5,589,828 | 12/1996 | Armstrong | 341/20 |
| 5,589,854 | 12/1996 | Tsai | 345/161 |
| 5,619,180 | 4/1997 | Massimino et al. | 340/407.1 |
| 5,625,576 | 4/1997 | Massie et al. | 364/578 |

OTHER PUBLICATIONS

Iwata, Hiroo, "Pen–Based Haptic Virtual Enviroment" Proceedings of IEEE Virtual Reality Annual International Symposium (Sep. 18–22, 1993, Seattle, Washington).

Kim, Won S. et al., "Graphics Displays for Operator Aid in Telemanipulation", IEEE 1991, pp. 1059–1067.

Fisher, S.S. et al., "Virtual Enviroment Display System", ACM 1986 Workshop on Interactive Graphics.

Tan, Hong Z., et al., "Human Factors for the Design of Force–Reflecting Haptic Interfaces," Tan, Srinivasan, Eberman, & Chang, ASME WAM 1994, pp. 1–11.

Colgate, J. Edward et al., "Implementation of Stiff Virtual Walls in Force–Reflecting Interfaces", Sep. 22, 1993, pp. 1–9.

Fischer, Patrick et al., "Specification and Design of Input Devices for Teleoperation", 1990.

Rosenburg, Louis B., "Virtual Fixtures as Tools to Enhance Operator Performance in Telepresence Enviroments," SPIE Telemanipulator Technology, 1993.

Buttolo, Pietro et al., "Pen–Based Force Display for Precision Manipulation in Virtual Enviroments", IEEE, Mar. 1995, pp. 1–8.

Burdea, Grigore et al., "Dextrous Telerobotics with Force Feedback—An Overview", Robotica 1991, vol. 9.

Marcus, B.A., An, B., Eberman, B., "EXOS Research on Master Controllers for Robotic Devices," Fifth Annual Workshop on Space Operations Applications and Research (Soar '91), pp. 238–245, Jul. 1991.

Smith, Geoffrey, "Call it Palpable Progress," Business Week, Oct. 9, 1995, pp. 93–96.

Snow, E. et al., "Compact Force–Reflecting Hand Controller," NASA Tech Brief, Pasadena, CA, Apr. 1991, pp. 1–3 and 1a–15a.

Rosenberg. Louis B., "Perceptual Design of a Virtual Rigid Surface Contact," Center for Design Research, Stanford U., Armstrong Laboratory, AL/CF–TR–1995–0029, Apr. 1993.

Adlestein, Bernard D. et al., "Design & Implementation of a Force Reflecting Manipulandum for Manual Control Research", 1992, pp. 1–24.

Bejczy, Antal K., "The Phantom Robot: Predictive Displays for Teleoperation with Time Delay", IEEE 1990, pp. 546–550.

Kotoku, Tetsue et al., "Environment Modeling for the Interactive Display (EMID) Used in Telerobotic Systems", IEEE Nov. 3–5, 1991, pp. 999–1004.

Ouh–young, Ming et al., "Using a Manipulator for Force Display in Molecular Docking", IEEE 1988, pp. 1824–1829.

Rosenberg, Louis B. et al., "Perceptual Decomposition of Virtual Haptic Surfaces," IEEE, Oct. 1993.

Ouh–young, Ming et al., "Force Display Performs Better than Visual Display in a Simple 6–D Docking Task", IEEE 1989, pp. 1462–1466.

```
(World Poly_21
        (Object 1
                (Poly 1 (Edges 1 1 2 3 7 7 9 9) RED (Hardness 21))
                (Poly 1 (Edges 15 20 33 33 56 8) RED (Hardness 21))
                (Poly 1 (Edges 3 3 5 6 3 3 2 1) RED (Hardness 21))
        )
        (Object 2
                (Sphere 2 (Center 21 33 40) (Radius 20) GREEN (Stiffness 2))
                (Box 3 ...   (Stiffness 21) (Hardness 3))
        )
)
```

Figure 5

| Native Operating System and/or Computer Architecture | Operating System or Computer Architecture Dependent Routines | Applications Layer<br>    Games<br>    Simulations<br>    Design CAD/CAM<br>    Graphics and Touch Applications |
|---|---|---|
| | | Applications Programmer Interface (API) Layer<br>    Call for communications<br>    Calls for Adding/Deleting/ Parameterizing Controls<br>    Calls for device connection/initialization<br>    Calls for High Level Effects and Instantiation of Geometry |
| | | Communications Layer<br>    CSCI Protocol encoders/parsers<br>    Control of ports, sockets, shared memory structures<br>    Control of Communications Message Processes<br>    Big/Little Endian Conversion |
| | | Servo or Device Driver Layer<br>    Control of O/S events and interrupts<br>    Control of Servo Process and Control Execution<br>    Access to Device Through DCI Routines<br>    Dynamic Transformations and Units Conversions |

Figure 8

Plot of Force Feedback Device Position
Sample ($X_n$) vs. Time ($T_n$)

Plot of Force Feedback Device Position Sample ($X_n$) vs. Time ($T_n$)

Velocity Estimate: $\dot{X}_n = 2aT_n + b$

Acceleration Estimate: $\ddot{X}_n = 2a$

Plot of Force Feedback Device Position Sample ($X_n$) vs. Time ($T_n$)

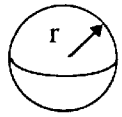

Sphere
Parameters: r, radius

Bounding Box: +/- r
Contact: avatar point less than radius

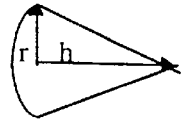

Cone
Parameters: r, radius, h, height

Bounding Box: is same as Cylinder
Contact: perpendicular drop point between endpoints of centerline and perpendicular drop distance less than the cone radius at the centerline drop point.

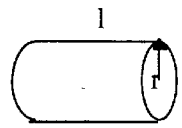

Cylinder
Parameters: r, radius, l, length

Bounding Box: +/- r, +/- r, +/-l/2
Contact: perpendicular drop to centerline less than r and drop point between endpoints of centerline

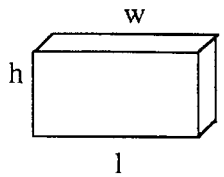

Box
Parameters: l, length, w, width, h, height

Bounding Box: +/- l/2, h/2, w/2
Contact: avatar within bounding limits

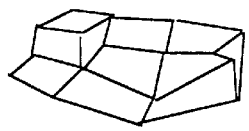

Polygonal Models
Parameters: vertex list, connectivity list

Bounding Box: maximum x, minimum x, maximum y, minimum y, maximum z, minimum z (plus sub-boxes and per-polygon boxes)

B-Spline Patch Models
Parameters: vertex list, connectivity list

Bounding Box: maximum x, minimum x, maximum y, minimum y, maximum z, minimum z (plus sub-boxes and per-polygon boxes)

Figure 22

HAPTIC BROWSING

REFERENCE TO RELATED APPLICATION

This application claims priority of continuation of U.S. patent application Ser. No. 08/854,375, filed May 12, 1997, (now U.S. Pat. No. 5,831,408), which is a continuation of U.S. patent application Ser. No. 08/543,606, filed Oct. 16, 1995 (now U.S. Pat. No. 5,629,594), which is a continuation-in-part of U.S. patent application Ser. No. 08/257,070, filed Jun. 9, 1994 (now U.S. Pat. No. 5,459, 382), which is a divisional of U.S. patent application Ser. No. 07/984,324, filed Dec. 2, 1992 (now U.S. Pat. No. 5,389,865); U.S. Provisional application Ser. No. 60/018, 036, filed May 21, 1996; and U.S. patent application Ser. No. 08/854,375, filed May 12, 1997, the entire contents of all of which are incorporated herein by reference.

FIELD OF THE INVENTION

The present invention relates generally to force-feedback and haptic devices and, in particular, to a method for browsing geometrical databases utilizing tactile feedback.

BACKGROUND OF THE INVENTION

Specialized force-feedback devices originated in the 1960's with the introduction of teleoperations, wherein, typically, a smaller controller or master robot was moved by an operator to control the movements of a larger slave robot. Forces detected at the slave were then fed back to the operator through actuators at the location of the master. Such prior art is discussed in U.S. Pat. Nos. 5,389,865, 5,459,382, and 5,629,594 to Jacobus, et al, and also described elsewhere in the literature.

In the late 1980's, NASA funded several programs using force feedback devices which were not identically configured as miniature versions of a slave device. This advance enabled an operator such as an astronaut to control a number of different space-based robots and cranes from a "universal" controller. To realize this concept, the master controller was logically connected to the slave through a network of computers which were capable of translating the master kinematics typically into Cartesian coordinates and from Cartesian to slave kinematics (and back again).

With such computer translation in place on the master side of the system, it becomes possible to send inputs from the master, be it a joystick, wheel, yoke, or other type of manipulator, to a simulated slave rather than to a real one, and to accept forces from the simulation for application to the master as well. The simulation need not represent a real device, like a crane or robot, but may be a simulated vehicle, weapon or other implement. The simulation may also reside in a person performing a task in a virtual world such as walking, handling objects, and touching surfaces). Such innovations are among those disclosed in the patents referenced above.

When forces are generated from an abstract virtual environment, often the meaning of the force sequences is in their relative relationship as opposed to the generation of absolute force values. For instance, one reason why a particular object may seem hard and another soft may be that the "hard" object simply allows less push-in when touched as compared to the other. This kind of relationship may be maintained between virtual objects at any absolute average force output, assuming the ratio of the two values remain the same (and, to a lesser extent, when greater-than and less-than relationships are maintained).

When translating abstract forces to real forces at a force reflecting device, it may be desirable to map the virtual forces down to the scale offered by the device. For instance, when an explosion special effect is played, the shake generated is typically much smaller than would naturally result from the explosion. For many tasks, there is an appropriate level of force which maximizes task performance and user preferences. In addition, some users prefer different levels of average force output.

SUMMARY OF THE INVENTION

The present invention provides methods for simultaneously browsing, or viewing, touching, attaching to, or manipulating, object descriptions contained within files both visually and haptically. The files may be local to a computer system or located across a network on one or more computer systems. In a preferred embodiment, the invention preferably renders haptic features using a layered architecture to support multiple axes per device, multiple devices per servo layer, multiple servo layers per communications layer, and multiple applications accessing common or different force-feedback devices.

BRIEF DESCRIPTION OF THE DRAWINGS

FIG. 5 provides hierarchical description files for two objects in a haptic/visual browser;

FIG. 8 is a drawing of a layered force-feedback architecture;

FIG. 22 provides a series of drawings which illustrate primitive force generating objects and associated descriptive parameters;

DETAILED DESCRIPTION OF THE PREFERRED EMBODIMENT

Figure 1:
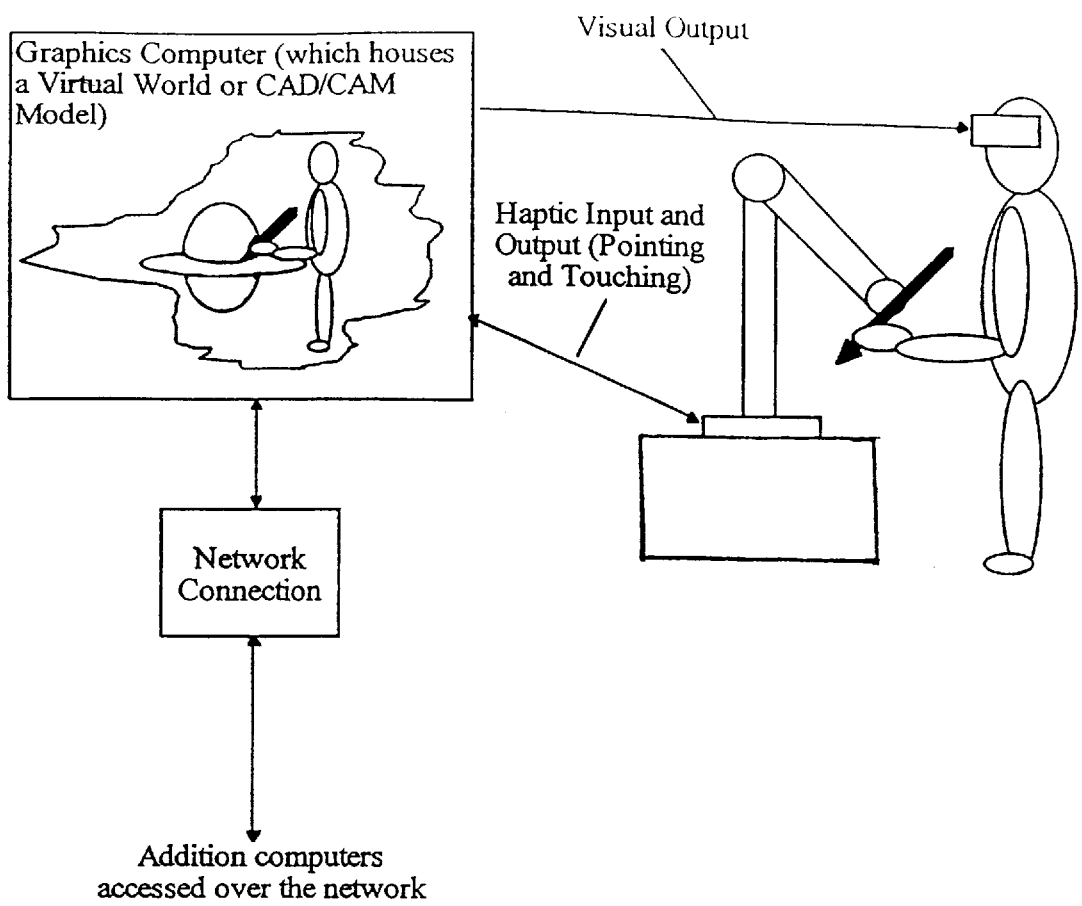
FIG. 1 is a simplified drawing used to illustrate tactical interaction with geometric objects described within a virtual world according to the invention.

U.S. Pat. Nos. 5,459,382, 5,389,865 and 5,629,595 disclose devices and methods for providing users with a touch or tactile interface into a virtual world including virtual objects; that is, objects which are not real, but rather, are defined by a computer, model or simulation. The present invention builds on these teachings by facilitating tactical interaction with geometric objects described within a virtual world representation using a geometric probe logically attached to the haptic or tactile device (FIG. 1). This touch support representation is synchronized with a comparable representation of the world for visualization or graphical rendering, thereby enabling the world to be both seen and touched. Extending this analogy to nomenclature associated with visualization, the generation of forces from the act of touching virtual objects is referred to herein as haptic rendering, and the act of both touching and viewing the objects (or other data) is referred to as haptic browsing.

Figure 2:
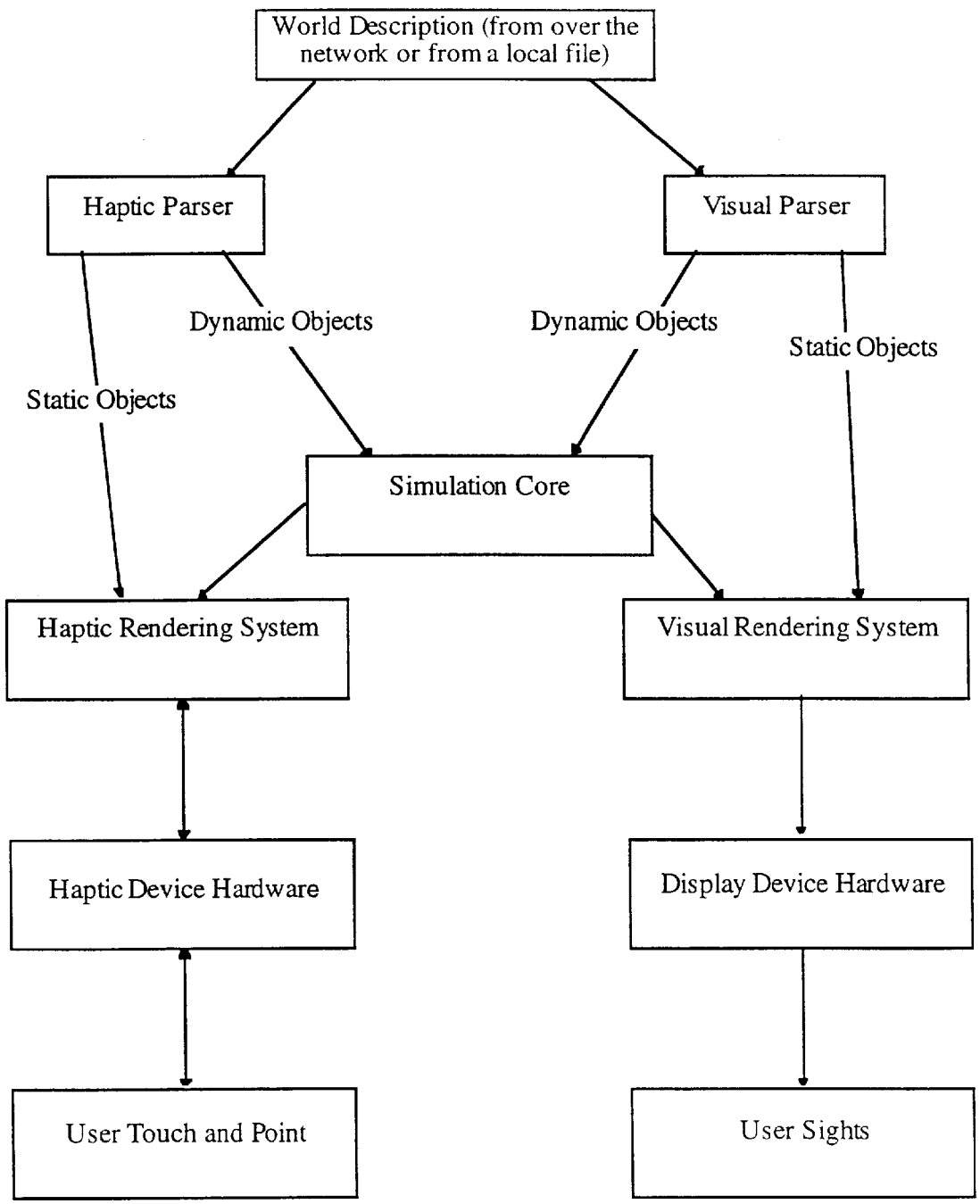
FIG. 2 is a diagram used to illustrate important elements of a haptic/visual browser.
Figure 3:
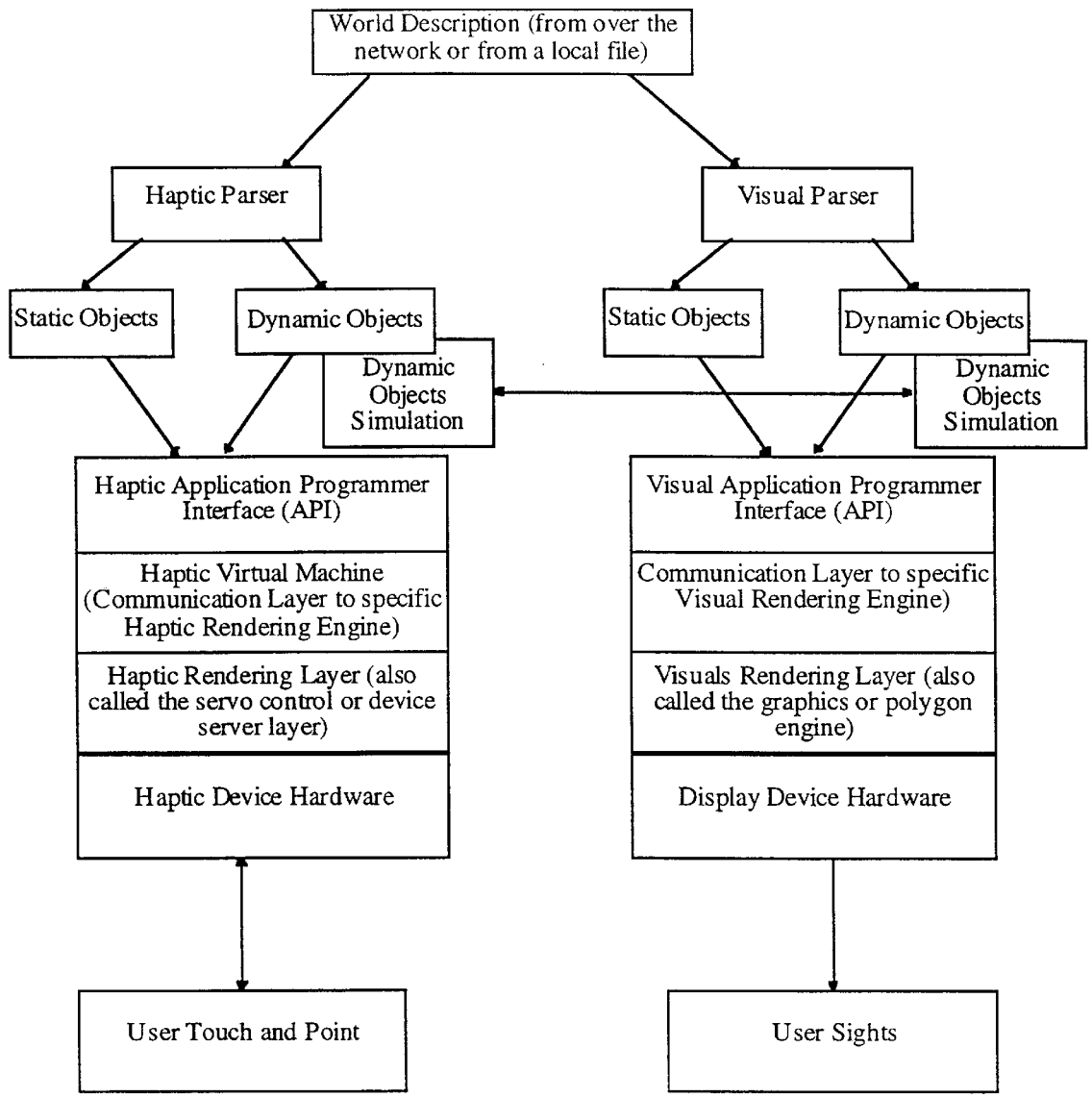
FIG. 3 is a flow diagram which shows how a physical device may be connected through a control arrangement to a simulated or virtual environment.

FIG. 2 presents the basic elements of a haptic/visual browser according to the invention, and FIG. 3 is a flow chart which represents an attendant method. In particular, FIG. 3 shows how a physical device may be connected through a control arrangement to a simulated or virtual environment. Position, velocity, and/or acceleration are measured at the controller (and therefore also from the user), and these values are sent to a computer controller bound to a virtual geometrical element or "probe." This probe, which may be alternatively referred herein as an "avatar," moves through the virtual environment, occasionally approaching or touching elements having mathematically described geometries within the environment.

Figure 4:
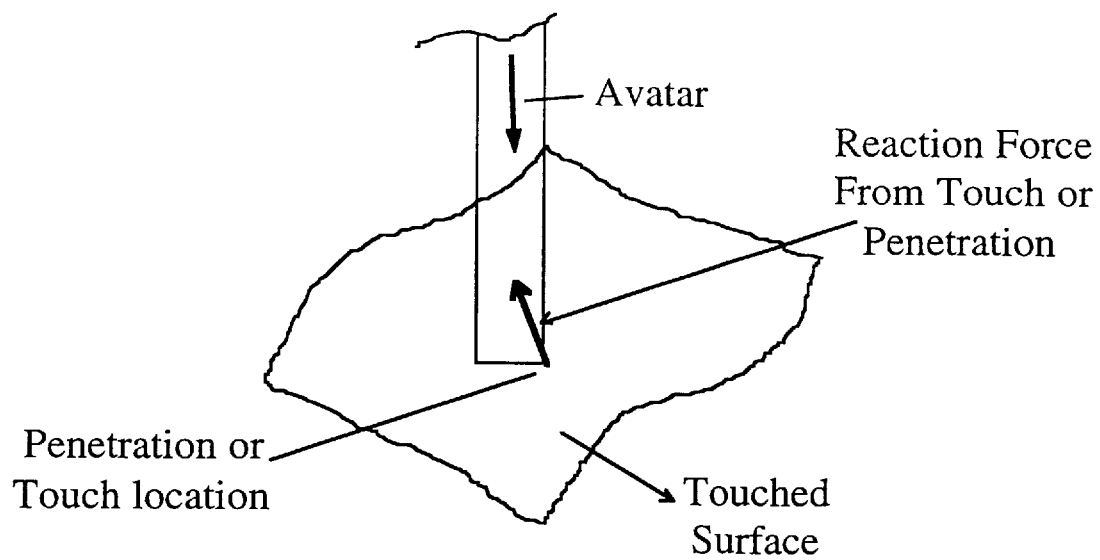
FIG. 4 is a simplified drawing which shows how response forces are generated as an avatar collides with a virtual object.

When the avatar collides with a virtual object (FIG. 4), the collision event generates response forces, which, in turn, cause the controller to move to updated position, velocity, and acceleration states, thereby conveying the collision event to the user by providing a feeling for the objects associated with the collision. This process, referred to as haptic rendering, generates forces based upon geometric descriptions and touching point locations. Note, however, that an actual collision can be replaced by proximity, entry into/out of a field, such as magnetic or gravimetric, or entry into a new medium, such as from air to water. In addition, since avatar (and haptic device or controller) position, velocity, and acceleration states are made available to the virtual reality simulation, the avatar position and other simulated state changes can be stimulated through user motion and collision events.

Concurrently with maintaining avatar and static geometry data, the geometry data is preferably also used to generate three-dimensional, viewable imagery. Although conventional visual rendering is well known, unique to this invention, are processes associated with haptic rendering, including the way in which such rendering is synchronized with visual rendering so as to effect a multi-media (i.e., touch and sight) immersive virtual reality.

Figure 6:
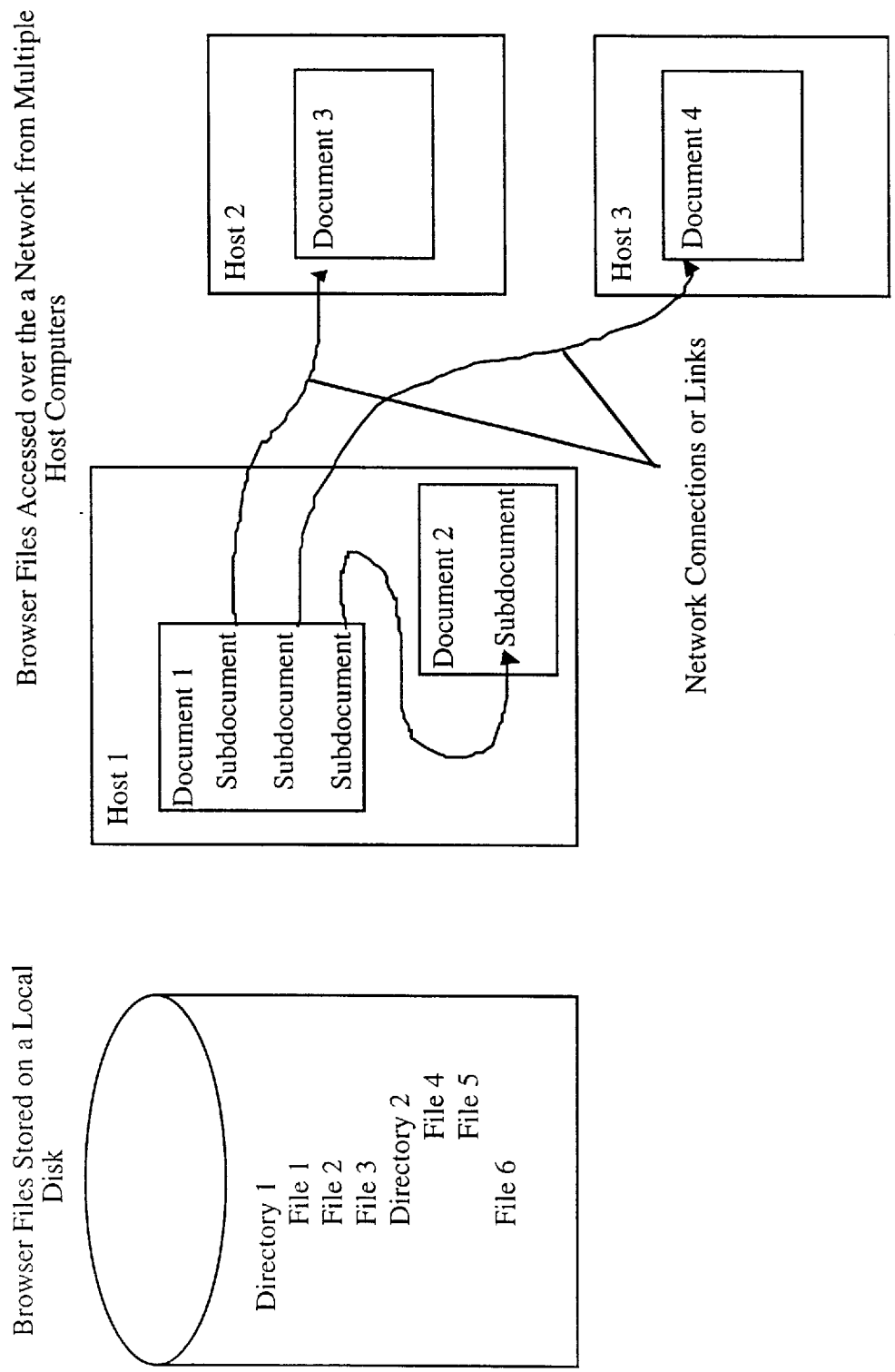
FIG. 6 is a drawing which shows how browser files may be stored on a local disk or, alternatively, accessed through a network from one or more host computers.

The concept of geometrical database browsing arises in part from the recognition that the geometric data which is loaded into the virtual world, thus initializing it, described as a hierarchy of objects may be described as statements or records in files (FIG. 5). As shown in FIG. 22, such data may represent simple objects, polygon arrays, and/or b-spline patches (FIG. 22). As files, which may take the form of a collection or records or a single record, an object description can be read into memory for instantiation into the virtual world (by sending parsed forms of these records to the haptic rendering processing routines or the visual rendering processing routines), can be moved to different spots or named locations within the files system, or can be sent over a network (FIG. 6). Haptic/visual browsing is the function of reading the geometry description files from any source and causing them, under user direction, to be rendered visually in a haptic sense, and optionally, with sound generation or other characteristics as well.

The actual form of the geometrical database can be application-specific, as in the case of many CAD/CAM system databases, or can represent an industry standard such as DXF (the AutoCAD exchange format), IGES or PDES (industry standard graphics and product design formats), and/or VRML (a standard graphics format used to represent objects and object hierarchies for downloading and browsing over the Internet World Wide Web—typically in conjunction with HTML, the World Wide Wed Hypertext Mark-Up Language). Since the external file format is translated into a common internal form through format-specific translators, the methods described herein are format-independent, and include all representative forms.

The foundations of haptic rendering may be explained with reference to FIG. 7. A servo shell process begins by initializing interrupt loop data structures and linkages. After this is completed, the interrupt process runs every clock interval to provide the servo routines with a deterministic time base. The user initializes the desired time interval associated with the servo loop (i.e., shorter for crisper response—longer to accommodate longer interrupt processing loops.

When the interrupt timing routine determines that it is time to run the servo code, it first checks via overrun logic to determine if a previous call to the servo routines is still being processed. This may be carried out through interlocking flags. If the last loop has not yet completed, such that there are too many commands or controls to be executed in the user-programmed interrupt call-back period, an overrun is signaled and the new interrupt is rejected until the old one is fully completed, with servo calculations compensating for time normalization based on the overrun information.

When the servo loop begins to run, it first collects each directly measurable haptic device state value (typically position), computes estimates for velocity and acceleration, and then computes an optional sets of translations, scales, and rotations on the device states. The servo loop then enters a set of processing routines which iterate down a list of installed control functions and commands. A control is eligible for execution if the state falls within a predefined bounding box and if other control specific checks indicate eligibility to run. When a control function executes it reads its own local memory, which may contain values sent in by the non-interrupt loop, a set position coordinates, velocities, and accelerations. The control uses its specific internal variables, and this external device state information, to compute a set of force/torque contributions for application to the haptic device axes.

The force/torque contributions to the various axes are appropriately scaled and applied to a running sum of contributions, which are summed across multiple control function calls, thus giving superposition of effects capability. When the control/command function lists are completed, the resulting final set of forces (or torques) become the values set into the output digital to analog interfaces, thus setting current which generate forces and torques from the interface device hardware.

Layered over the interrupt "loop" is a communications layer which polls for input from the command port or data structure and output from the interrupt loop and processes these inputs and outputs if present. If input becomes available, it is read and decoded. For a typical protocol, the input will consist of simulation positions or forces which are transformed from native simulation coordinates to scaled device coordinates, which are then used to update gains, center locations, or forces in one or more interrupt level servo functions to create a force "feel." The output from the layer will typically be center locations or offsets which are transformed back to simulation coordinates and transmitted out to a high-level application layer.

Users may install pointers to their own control and/or command code, affording complete flexibility from the servo structure, which allows layering of higher-level applications programmer interfaces on top of the basic two-level system made up of the servo and foreground levels. However, because one object of this invention is to provide an architecture for generating a tactile virtual reality in response to user input and a database of virtual world geometry, additional layers above the basic communications layer are required, as shown in FIG. 8. These layers include a physical device level over the servo layer, and above the communications layer there is one or more layers of application programmer's interface in communication with an applications layer.

These various layers arise naturally due to several factors, such as:

1. the need to make applications easier to create by forcing higher-level interface codes (API layers);
2. the need to communicate parameters from the application to the device control layers (communication layer); and
3. the need to interface to device hardware (device specific or servo layer), and to provide device-to-device independence for the higher applications layers (API and application).

Figure 9:
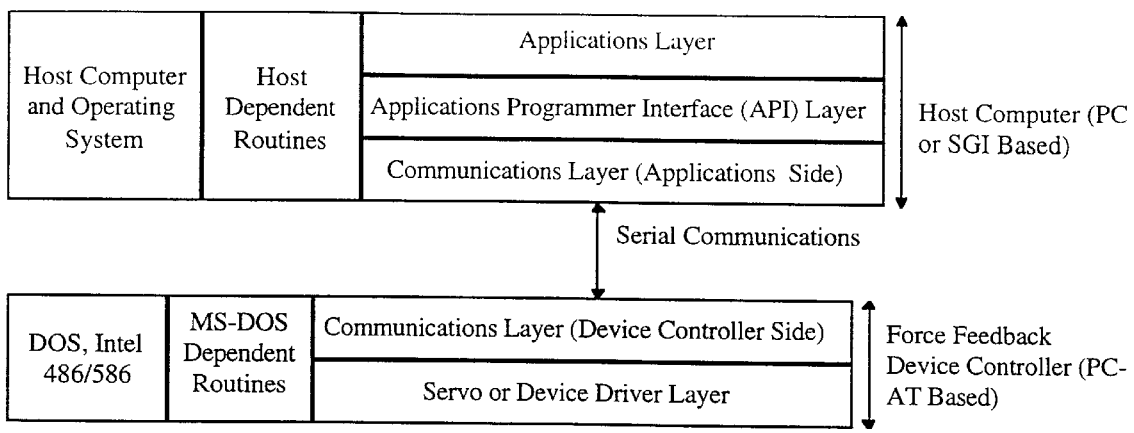
FIG. 9 illustrates one type of layering mapping in a personal computer implementation.
Figure 10:
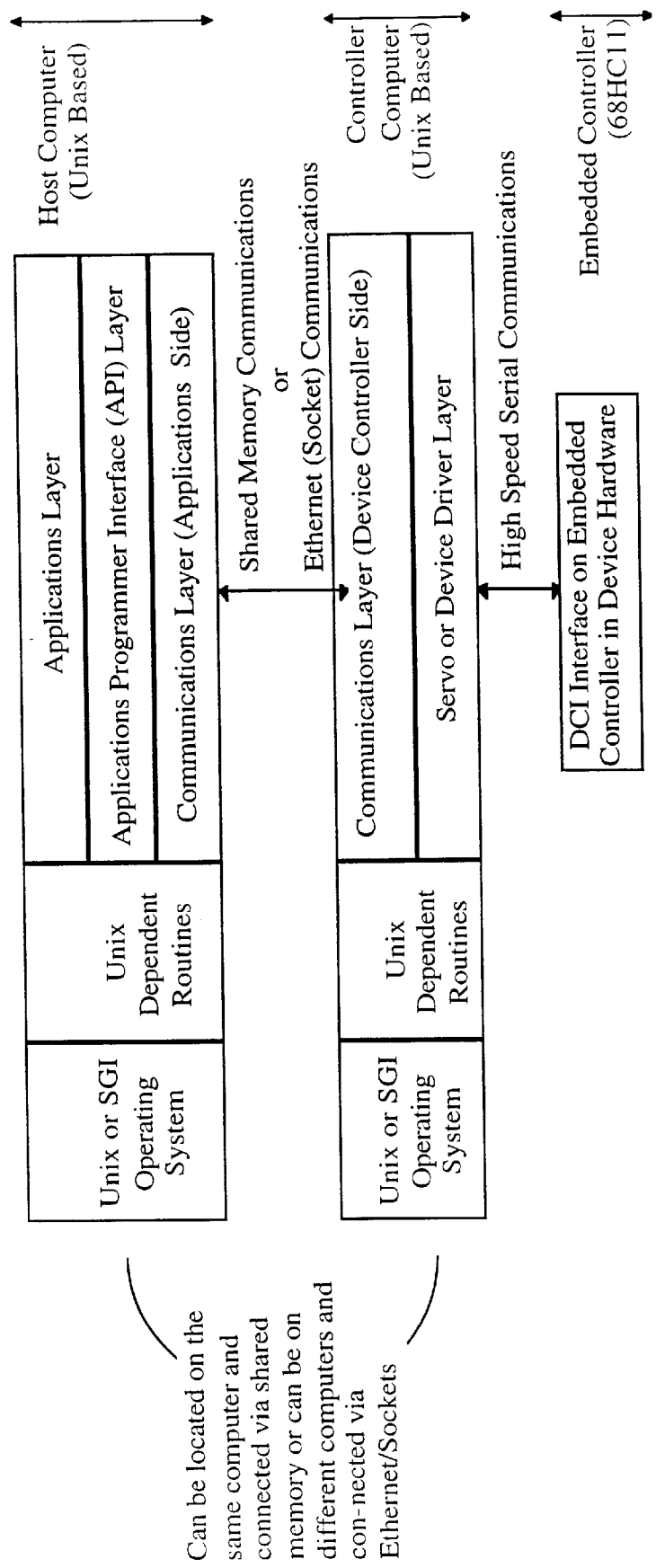
FIG. 10 illustrates an alternative layer mapping architecture in a Unix-based system.
Figure 11:
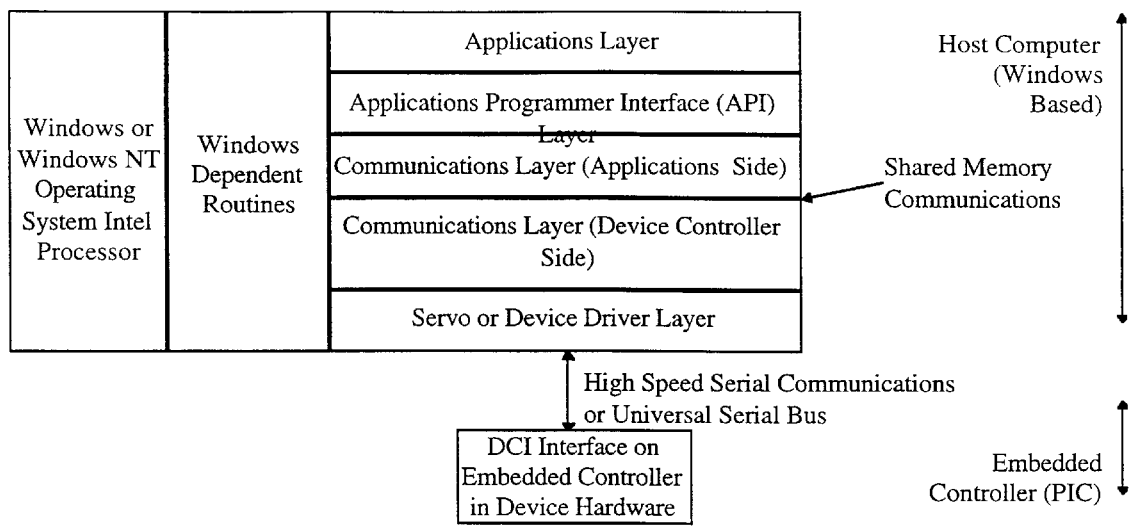
FIG. 11 illustrates yet a further functional mapping in a Windows environment.

The various layers depicted in FIG. 8 may be located in many places. In a personal-computer based implementation, the API and applications layers may be implemented on a host, both in the operating system and on top of the operating system levels, as shown in FIG. 9. The servo layer may reside on a dedicated controller connected to the hardware device. With a more powerful platform, all layers may be located at the host, with the communications and servo layers being placed into embedded controllers within the physical interface device. FIG. 10 illustrates an implementation involving Silicon Graphics and Unix, and FIG. 11 concerns the Windows operating system. Where the layers are placed is not critical to the basic invention, but rather placement is set by specific cost and performance considerations.

Figure 12:
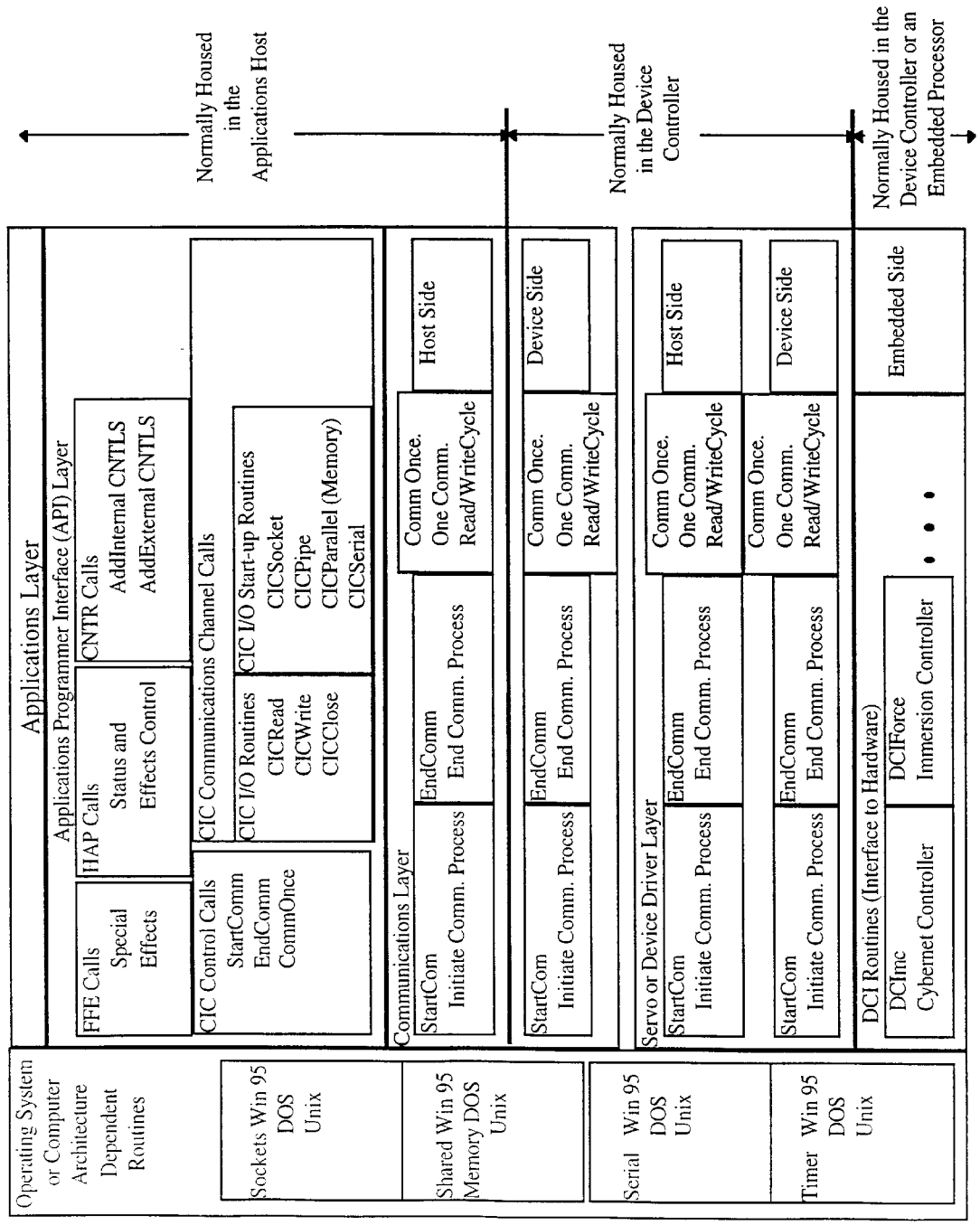
FIG. 12 illustrates a comprehensive force-reflection architecture including submodules within layers.

FIG. 12 illustrates a more elaborate force-reflective architecture according to the invention. As indicated in the diagram, four distinct layers make up a minimal arrangement. These are the applications layer, the API layer, a communications layer, and the servo layer. The servo layer, sometimes called the device driver, can include dynamically linked force controls as indicated in the previous section, but can as easily be formed with a fixed set of built-in controls. Both approaches have been implemented for different device types, and in partitioning systems between multiple computer units.

Figure 13:
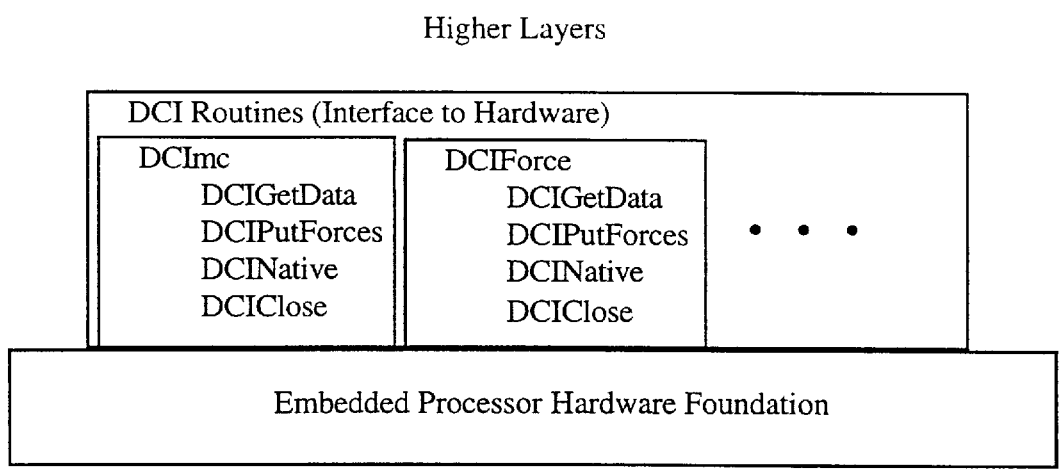
FIG. 13 is a drawing which illustrates a low-level layer structure associated with an embedded system.
Figure 14:
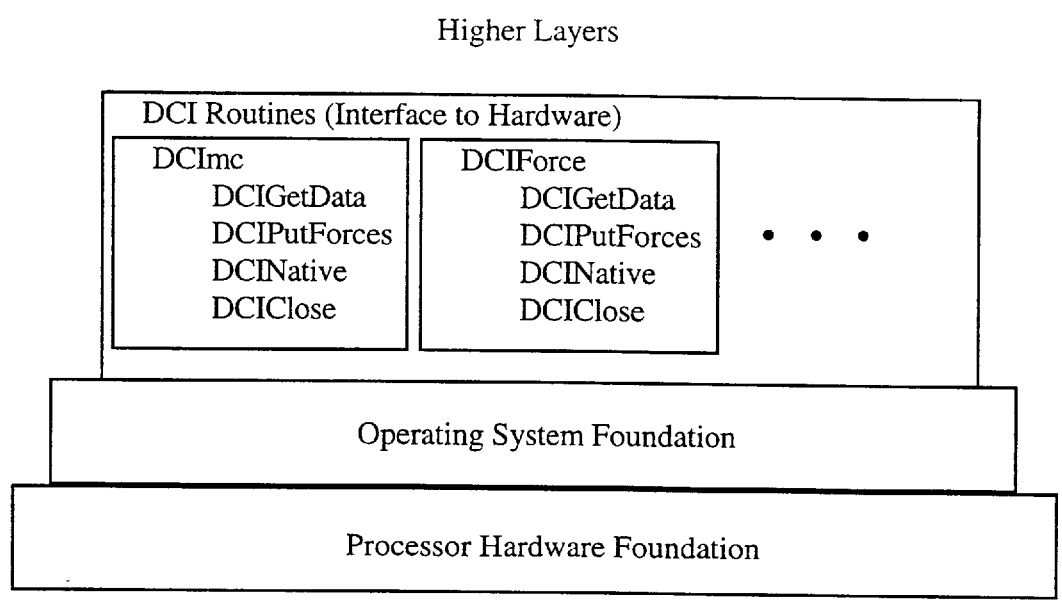
FIG. 14 illustrates a low-level layer structure over an operating system.

The hardware interface in the servo layer is depicted as DCI functions, which provide the calls to acquire data from the hardware, or to output forces to the hardware. These functions on an embedded system consist of output and input functions to system I/O hardware (FIG. 13). On a system with operating systems layers (FIG. 14), these may also be functions which cause data to be sent out standard ports (serial, socket, etc.).

Figure 7:
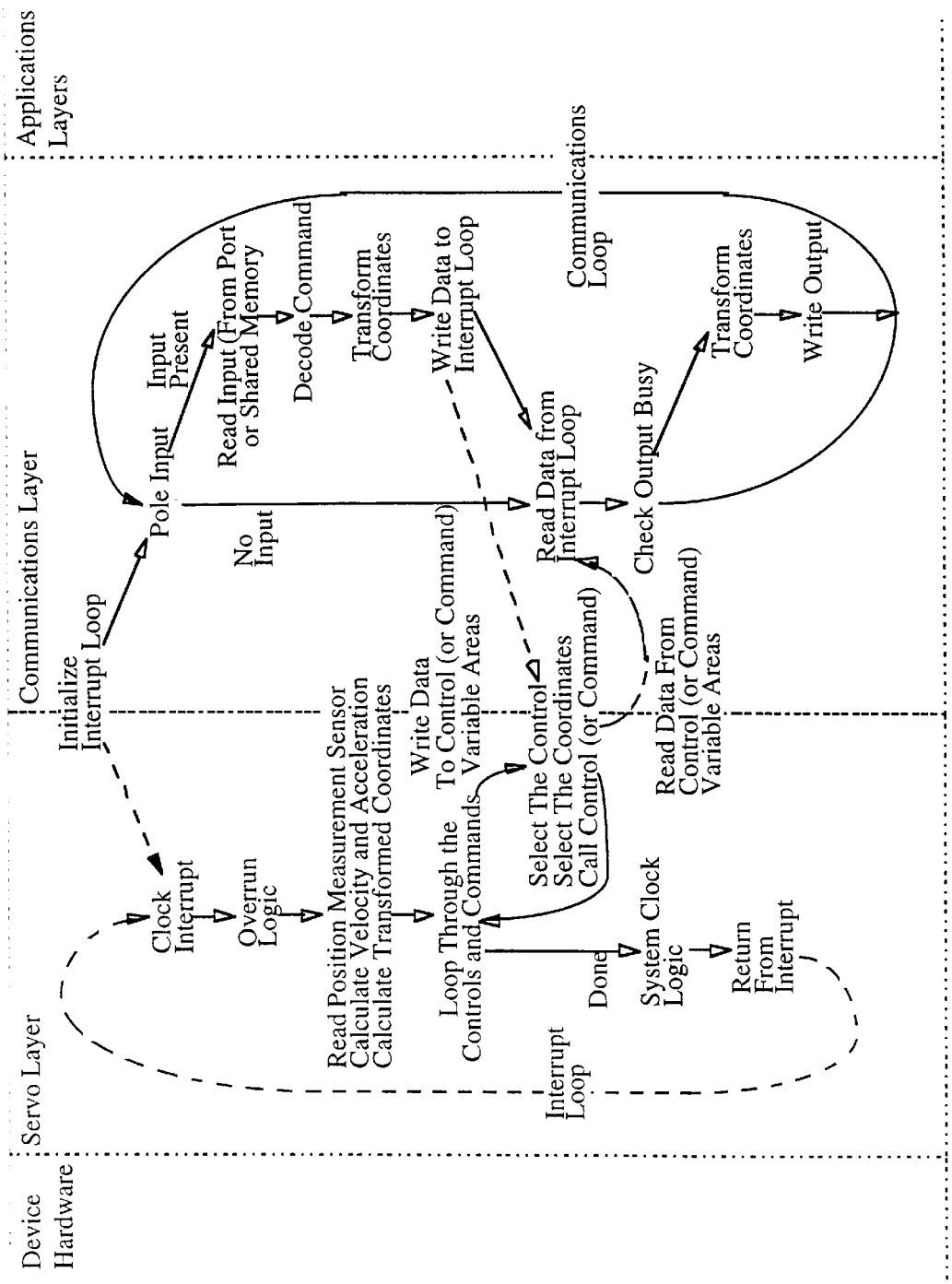
FIG. 7 is a flow diagram depicting layers associated with basic haptic rendering.
Figure 15:
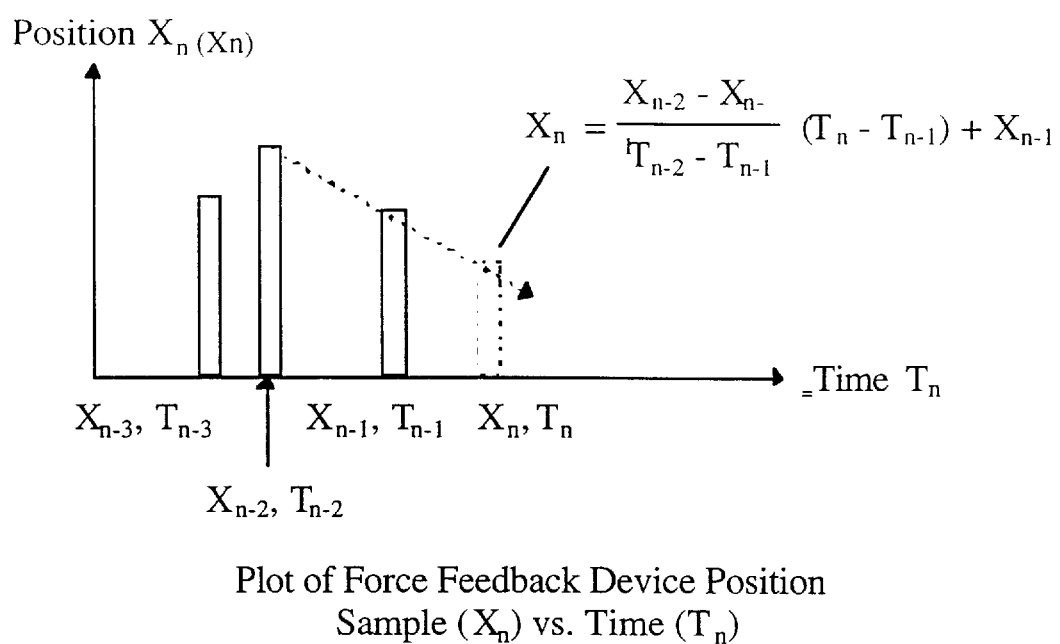
FIG. 15 illustrates a method of linear extrapolation.
Figure 16:
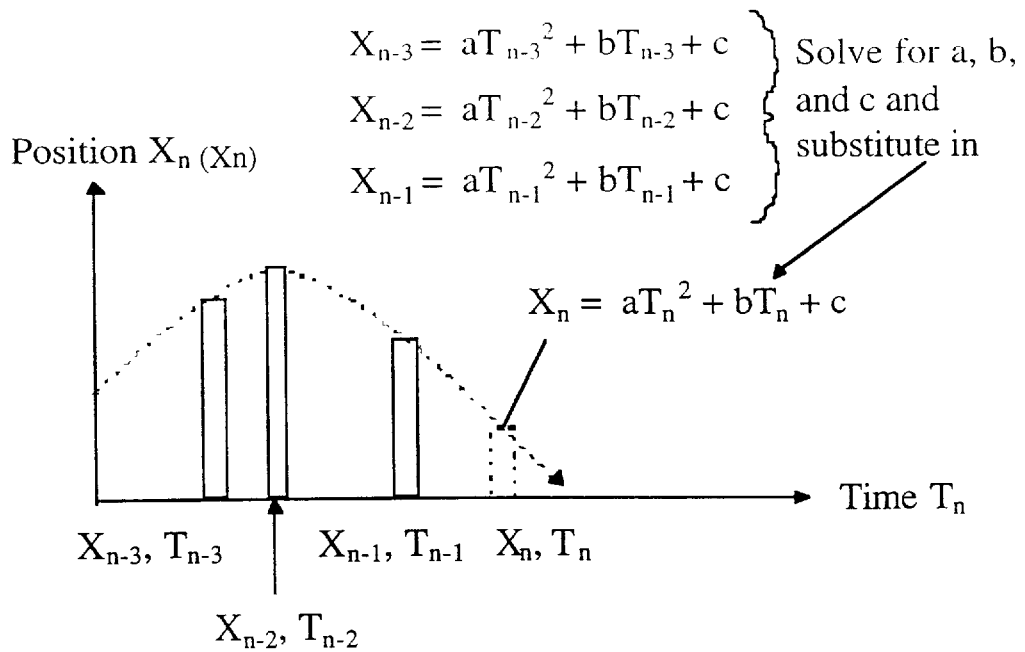
FIG. 16 illustrates a method of quadratic polynomial extrapolation.
Figure 17:
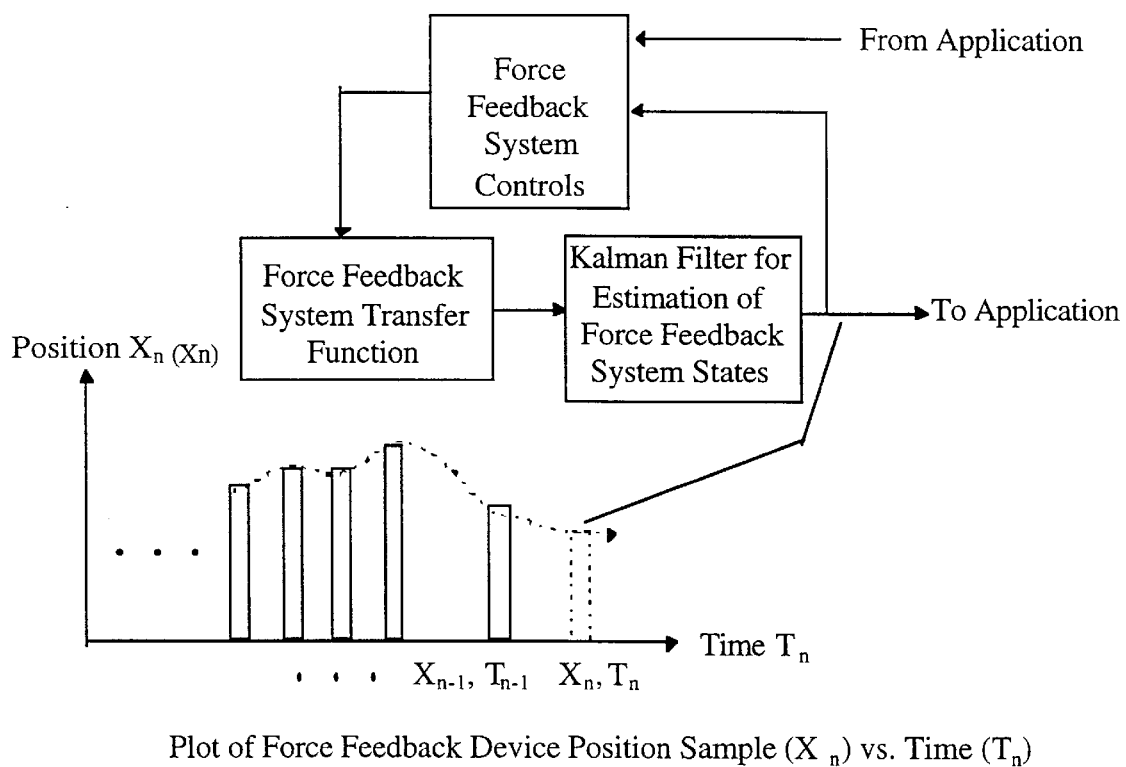
FIG. 17 illustrates a method of Kalman estimator extrapolation.

The basic servo loop shown on the left side of FIG. 7 executes a routine which gets device values using DCI hardware interface routines, estimates device state (acceleration, velocity, and position) using direct values and extrapolations. The extrapolations may be based on the current and previous values and a standard estimator algorithm such as linear, polynomial, or Kalman estimation. At least second order fitting is preferred because the estimation functions are then continuous in the second derivative, or acceleration. FIG. 15 show a linear extrapolator, FIG. 16 shows a quadratic polynomial interpolator, and FIG. 17 shows a Kalman extrapolator or estimator.

Upon estimating device state, the basic servo function sequentially evaluates each distinct control, which can be built-in or supplied by the user application (i.e., Internal and External), and the communications level preferably includes routines which can be called to add or remove either type. This sequential evaluation (FIG. 18A) can be replaced with a more complex time and conditions-based scheduling algorithm (FIG. 18B), which incorporate times, device state, including position, velocity, and acceleration plus status indicators or switches, and application state as reflected by the controls which are included for evaluation.

Figure 18A:
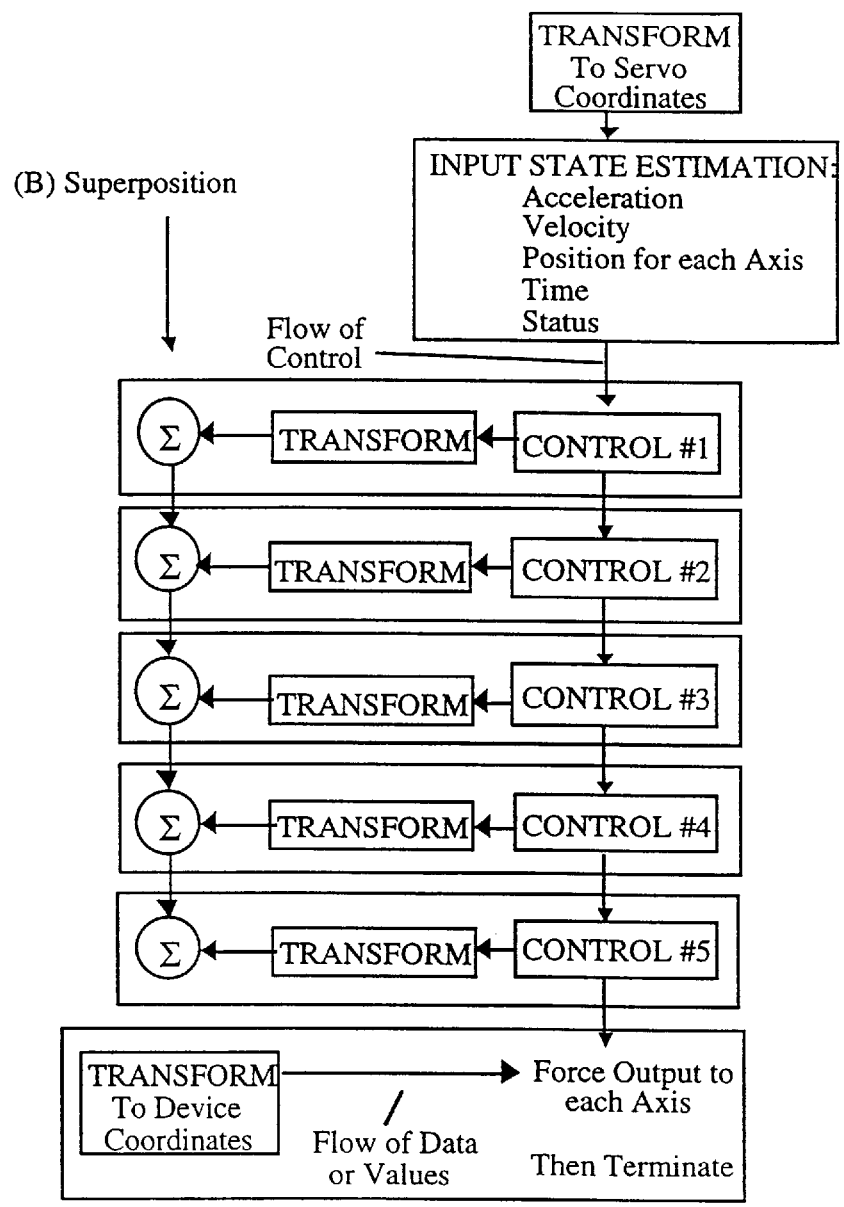
FIG. 18A illustrates a scheduling option providing sequential evaluation of controls and superposition of control output forces.

In FIG. 18A, controls are evaluated in strict sequential manner. The dotted lines show the flow of computed forces and superposition, while the black lines show program flow of control. Shown are provisions for coordinate transformations from device coordinates to virtual coordinates and units adjustment prior to state estimation and after each control output force vector. Also shown is a transformation of coordinates back to device coordinates prior to superimposed force application. Force/power management is performed in device coordinates after transformation, but prior to force application.

Figure 18B:
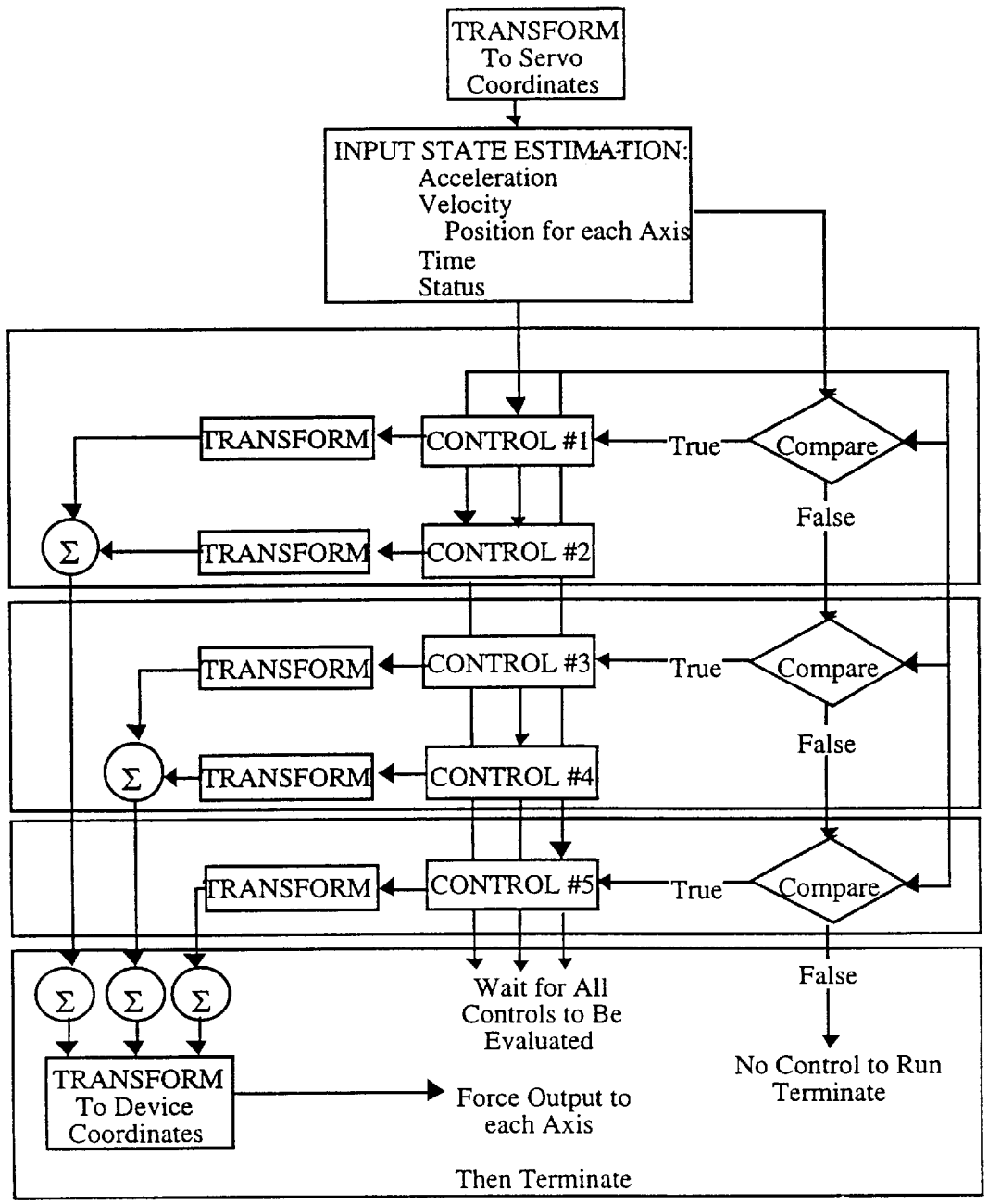
FIG. 18B illustrates a scheduling option wherein controls are evaluated in terms of time and conditions-based scheduling and superposition of control output forces gathered by each block activated by conditions comparison evaluating 'true'.

In FIG. 18B, the input state, time and status of the force reflecting device are used to determine which set of controls should be evaluated. Within each block, evaluation is still sequential, however, effectively all independently activated block are evaluated in parallel. Each force contribution is collected upon task thread completion, and combined for force output application as in the purely sequential approach to the left.

Upon completion of the evaluation, a superimposed set of forces/torques are ready for output to the device, or in the case of multiple devices, the entire set of devices. This superposition is used to provide support for multiple simultaneous force effects which manifest at the device at the same time. The iteration of the servo layer is then completed. Servo interaction can be controlled directly from the higher-level layers under application control, or evaluated in accordance with a standard clock interval or by the time it takes to evaluate the servo loop as an independent task in the operating system.

The communications layer includes functions which add or remove controls in the servo layer, allow higher levels to modify the controls by changing parameters, provide for the reading of state by the higher levels, and establish communications channels necessary to transfer the information from the APL layers to the servo layers. A basic routine performs one cycle through the foreground communications loop (on the right of FIG. 7), while another routine initializes and terminates conditions for repeated calls of the basic routine.

Each cycle through the foreground communications loop polls for input packets (if socket communications or serial communications are used) or checks memory structures (if shared memory is used), and parses the message items and Pokes values and/or creates instances of controls. Also, if relevant state information is requested from the Communications layer by higher level routines, CommOnce will acquire the information via a Peek, and send it back through memory or port. A main loop which continuously calls the polling function is used when the communications layer is spread across computer platforms, but when it is co-resident with the API layer, this polling can be done as a consequence of calls from the API layer.

Figure 19:
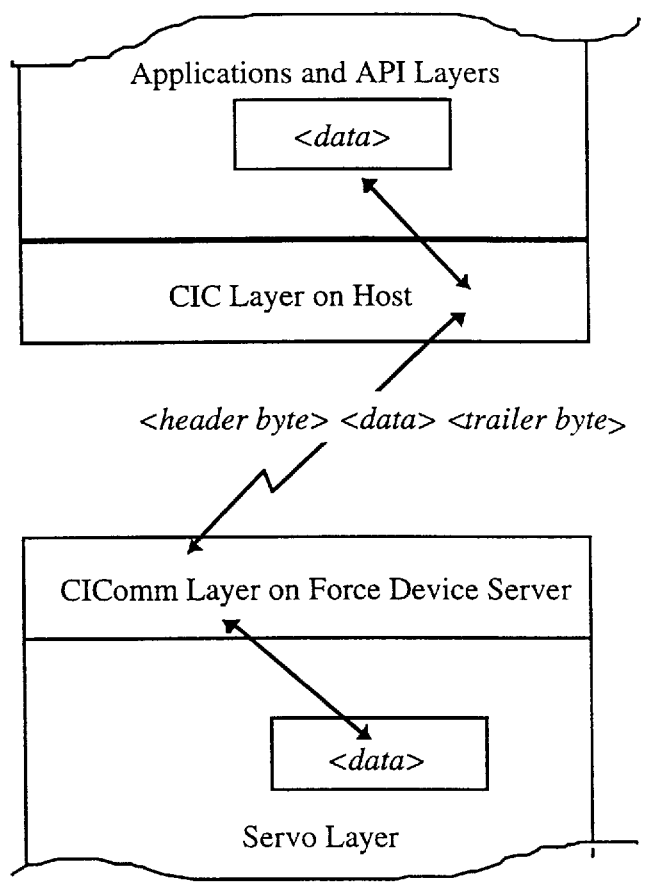
FIG. 19 illustrates data flow in packing to and from a servo layer and API layer.
Figure 20:
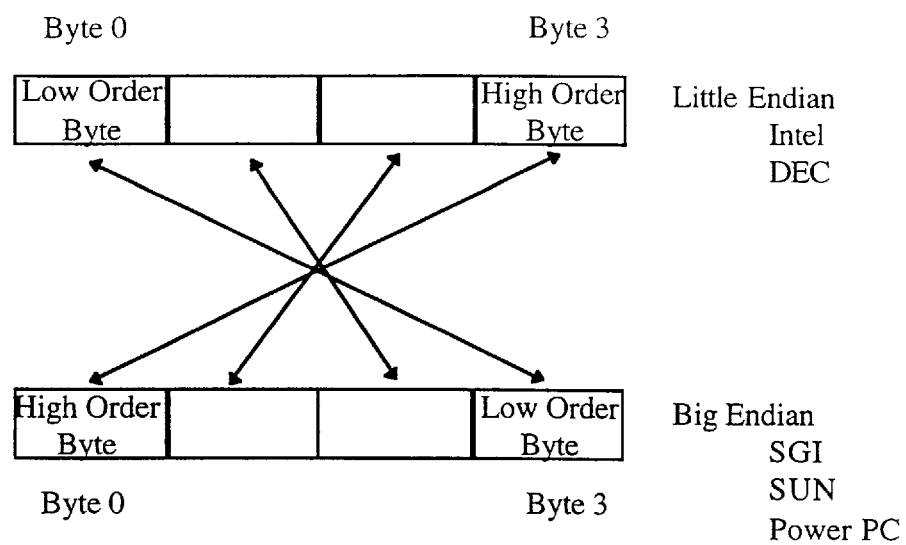
FIG. 20 illustrates big/little endian conversion within the CPCI protocol.

Information is transferred within the communications layer, from the API layer to the servo layer, through a specific Client Packet Communication Interpreter or CPCI (FIG. 19), which defines a packet protocol regardless of the communication medium, which may include memory, socket or input/output port—socket type communication includes transmission of Ethernet, Internet, and Intranets. This logic exists at the CIC and CIComm levels shown within the Communication layer. The division of software layers between computers or between tasks within a single computer is effected by hardware interconnections, memory, socket or input/output port, and thus data leaving the CIC level must be encoded for dispatch to the CIComm level and decoded in the other direction. This message encoding and decoding function is handled by the CIC and CIComm library of modules. The protocol as defined manages the translation of variables for big endian and little endian computers, so that division across client and servers having differing computer architectures is transparent (FIG. 20).

The following is a list of the different packets that are received and interpreted, along with a short description of module operations:

Initialize: This packet lets the HDS know exactly what language the Client is speaking with respect to data representation format (i.e. endian). After this packet is sent, the HDS will know if it will need to perform a byte swap on multiple byte data types received from the Client. The CPCI simply sets an internal variable in response to this packet.

Setup: This packet type contains a name/value pair. Both the name and value are text strings. Both the name and value determine what the CPCI do. The following presents a list of possibilities:

The name "DC_Initialize" causes the CPCI to start up communication to the haptic device if the value string is "ON", or to terminate communication to the haptic device if the value string is "OFF".

The name "PF_StartServoing" causes the CPCI to start up the Servo Iterator (See the Servo Iterator subsection) if the value string is "ON", or to terminate servoing if the value string is "OFF".

Any other name causes the CPCI to find the HDS variable that corresponds to the name string.

Then, if the value string is not empty, then fill the HDS variable to the value in the value string, or if the value string is empty (length zero), then the CPCI sends the value of the HDS variable to the client.

Instantiate: This packet causes the CPCI to instantiate a control and add it to the list of controls that ServoIterateOnce executes. The packet contains a string specifying the control type (e.g. "PID97"). The CPCI responds to the Client by sending it a list of the control parameters for this control as well as a number unique to this particular control.

DeInstantiate: This packet causes the CPCI to remove a specified control from the list of controls that ServoIterateOnce is executing.

Poke: This packet causes the CPCI to modify one or more of the control parameters specified in the packet to values that are also in the packet. This allows the Client to modify the behavior of instantiated controls.

Peek: This packet causes the CPCI to look up one or more of the control parameters specified in the packet. It then places the values of these parameters into a packet which it sends back to the Client as a reply.

Terminate: This packet causes the CPCI to close down communication to and from the Client.

Drive: This packet causes the CPCI to execute one servo iteration, as discussed above.

Units: This packet allows the Client to set the Units to be used by subsequently instantiated controls. The currently supported unit types are metric, normalized (between −1 and 1), and native (whatever the device reports/accepts).

AddDSV: This packet causes the CPCI to add a HDS pipe which will cause a control parameter's value to be set to either another control parameter's value (same or different control, same or different parameter). This allows the application to chain controls, or make one control feed another control data. The source control, source parameter, destination control, and destination parameter are all specified in the packet (controls by number, parameters by name string). The source may not be a control, however. It may also be one of the following values:

TIME: The current time (in seconds) as recorded in the HDS.

ELAPSED: The time (in seconds) since the last servo iteration.

POSITIONX: (Where X is the axis number) is the current position of a device axis.

VELOCITYX: (Where X is the axis number) is the current velocity of a device axis.

ACCELERATIONX: (Where X is the axis number) is the current acceleration of a device axis.

FORCEX: (Where X is the axis number) is the current force applied to a device axis.

TOGGLE_STATEX: (Where X is the toggle number) is the current state of the device toggle (0=released, 1=pressed)

TOGGLE_PRESSX: (Where X is the toggle number) is a variable that is 1 only during servo iterations where the toggle state has just changed from released to pressed. Otherwise the value is zero.

TOGGLE_RELEASEX: (Where X is the toggle number) is a variable that is 1 only during servo iterations where the toggle state has just changed from pressed to released. Otherwise the value is zero.

RemoveDSV: This packet causes the CPCI to remove a HDS pipe that has been previously created by AddDSV.

LoadSample: This packet contains the specifications and some portion of the data in a sample. The sample can be of multiple dimensions, and is referenced by name.

Start_Stop_Control: This packet causes the CPCI to change the state of an instantiated control to either running or stopped. Running controls in the control list are executed every servo iteration, stopped controls are still in the list, but are skipped (i.e. not executed).

The API layer includes functions which instantiate elements of geometry or special-effect codes. The API layer (or Layers) grow to accommodate specific applications. For instance, the following is list of routines implemented for computer game simulation support.

FFE_Force—Applies a force vector using each of the device's axes.

FFE_Impulse—Applies a force vector for a specified length of time.

FFE_Vibration—Vibrates device at specified frequency and magnitude as specified for each axis.

FFE_Spring—Causes device to pull/push with a specified strength for each axis.

FFE_Damping—Generates forces that resist motion by specified viscosity for each axis.

FFE_Mass—Generates forces that resist acceleration by specified inertia for each axis.

FFE_Buffet—Applies random forces across each axis with specified frequency/magnitude.

FFE_VibroKick—Causes a quickly fading vibration when a specified toggle is pressed.

FFE_Recoil—Applies a force for a specified time when a specified toggle is pressed.

FFE_MachineGun—Causes a repeating timed force while a specified toggle is pressed.

HAP_Open—Opens a communications channel to a haptic server and sets it up.

HAP_Close—Shuts down server and closes a communications channel to haptic server.

HAP_CallOpen—Opens a FunctionCall communication channel but does no setup.

HAP_SendConFigure—Sends a conFigure file to the haptic device server.

HAP_SetupLine—Adds a Name/Value pair to the configureuration.

HAP_StartServer—Starts a haptic server running.

HAP_DriveServo—Commands the haptic server to execute one servo loop.

HAP_GetDeviceInfo—Gets device specific information from a haptic server.

HAP_GetForce—Get the axes forces from the haptic server.

HAP_GetPos—Get the axes positions from the haptic server.

HAP_GetVel—Get the axes velocities from the haptic server.

HAP_GetAcc—Get the axes accelerations from the haptic server.

HAP_GetToggles—Get the status of toggle switches from the haptic server.

HAP_GetValuators—Get the status of analog valuators from the haptic server.

HAP_PutForce—Send axes Forces to the haptic server.

HAP_PutPos—Send axes Positions to the haptic server.

HAP_PutKP—Send axes Position error scale factors (spring value) to the haptic server.

HAP_PutVel—Send axes Velocities to the haptic server.

HAP_PutKV—Send axes Velocity error scale factors (damper value) to the haptic server.

HAP_PutAcc—Send axes Accelerations to the haptic server.

HAP_PutKA—Send axes Acceleration error scale factors to the haptic server.

HAP_Vibration—Command the haptic server to output periodic forces.

HAP_SampleEdit—Create and edit a Haptic sample.

HAP_SampleRandom—Create a random Haptic Sample.

HAP_PlayCntl—Specifies Control parameters for playing a sample.

HAP_Play—Specifies period of time over which Haptic sample is played.

HAP_PlayAdd—Specifies Additive factor for playing a sample.

HAP_PlayMult—Specifies Multiplicative factor for playing a sample.

HAP_SetHome—Sets the current physical device position as the 'home' point of the device.

HAP_PauseEffect—Command the haptic server to pause a previously instantiated effect.

HAP_PauseAllEffects—Command the haptic server to pause ALL previously instantiated effects.

HAP_RemoveEffect—Command the haptic server to remove a previously instantiated effect.

HAP_RemoveAllEffects—Command the haptic server to remove ALL previously instantiated effects.

HAP_RestartEffect—Command the haptic server to restart an effect that was previously stopped or paused.

HAP_RestartAllEffects—Command the haptic server to restart ALL effects that were previously stopped or paused.

HAP_StopEffect—Command the haptic server to stop a currently executing effects.

HAP_StopAllEffects—Command the haptic server to stop ALL currently executing effects.

HAP_Time—Gets the haptic server performance statistics.

HAP_LoadSample—Load a sample into HDS memory.

HAP_SendSetupLine—Send a setup name/value pair to the HDS.

HAP_SendSetupFile—Send a whole file full of setup name/value pairs to the HDS.

HAP_GetSetupData—Get the HDS setup value for the specified name.

HAP_Home—Set the position of the specified axis to zero in its current position.

HAP_SetUnits—Set the current units (metric, raw, or normalized).

HAP_SetTimeCallback—Allows the application to provide the HDS with a function for getting high resolution time. Lower-level functions which instantiate and control the servo level are:

CNTR_InstControl—Instantiates a control by name.

CNTR_DeInstControl—De-instantiates a control created in CNTR_InstControl.

CNTR_StartControl—Activate a control.

CNTR_StopControl—De-activate a control.

CNTR_StartAllControls—Activate all instantiated controls.

CNTR_StopAllControls—De-activate all instantiated controls.

CNTR_PeekAdd—Add an element to the peek request list.

CNTR_PeekSend—Send the peek request list to the HDS.

CNTR_PeekGet—Get one element from the peek reply list.

CNTR_Peek—Send peek request and get reply in one function.

CNTR_PokeAdd—Add an element to the poke list.

CNTR_PokeSend—Send the poke request list to the HDS.

CNTR_Poke—Create one-element poke list and send it to HDS in one function.

CNTR_PokeAddDSV—Create a data pipe from one control parameter to another.

CNTR_PokeRemoveDSV—Removes a data pipe created in CNTR_PokeAddDSV.

Alternative controls may be used to provide direct computation of forces from interaction of the device position point relative virtual surfaces. U.S. Pat. No. 5,459,382 discloses computation algorithms capable of generating forces from planes and conic sections. Extensions to all forms of parametric surfaces, would be apparent to one of skill in the art of computer graphics, including voxel descriptions, arrays of polygons (which may be defined as several planes bounded by lines or edges), and point cloud representations.

Figure 21:
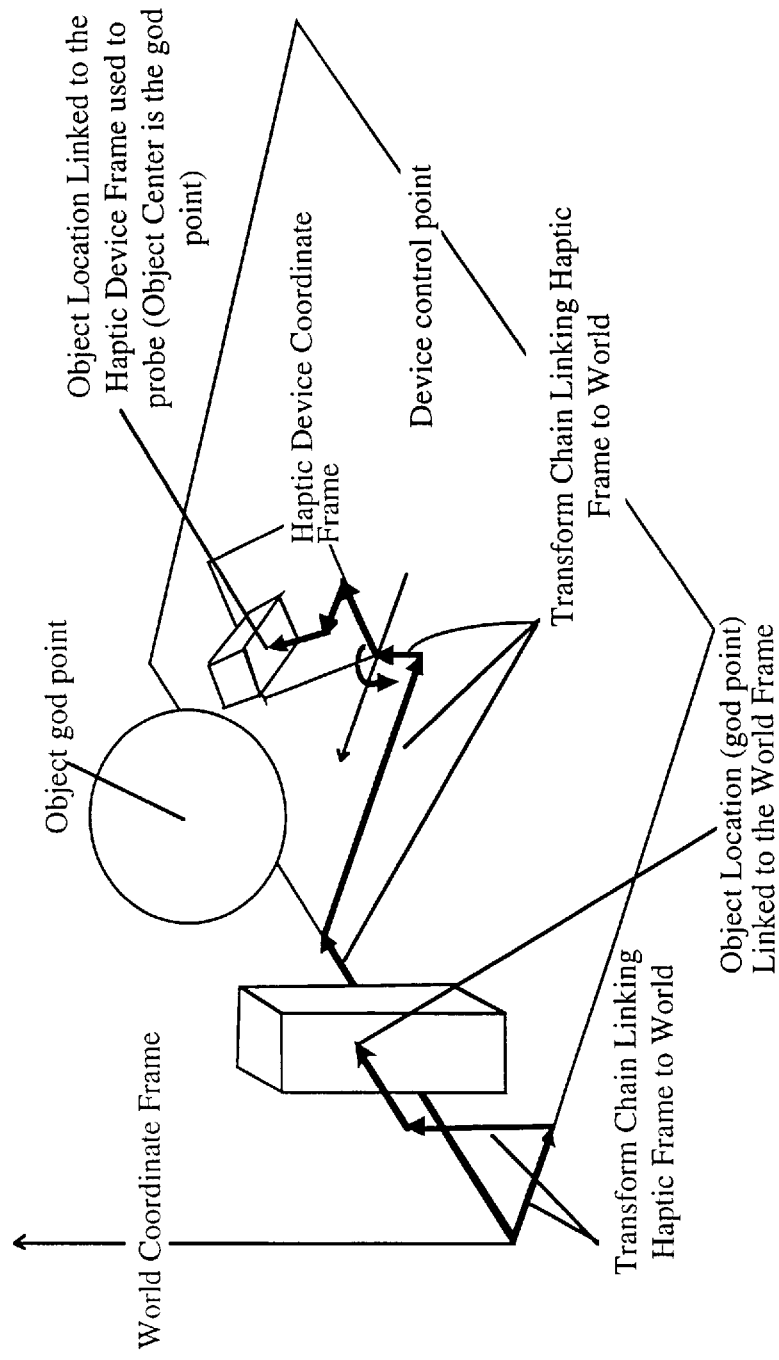
FIG. 21 is a drawing which shows fixed and movable objects, transform chains, and coordinate point definitions.

A more detailed description of the way in which geometrical elements are represented in one embodiment may be expressed through the use of two main types of controls. The transform control (abbreviated XFM) computes the transformation matrix responsible for transforming one coordinate system to another. In this manner, a chain of such transforms can be assembled to specify the kinematics of a given haptic device (FIG. 21). The object control (abbreviated OBJ) contains information describing an object in the scene. If the object is placed by the composite device transform mentioned before, the object's position in the scene will be specified by the device orientation.

To create other objects in the scene, other transforms can be created that do not depend upon the device; that is, they may be fixed to a world coordinate space, as shown in FIG. 21). Other objects can also be created and positioned using these transforms. In this manner, a world of objects and their positioning transforms is created, with objects moving as dictated by the device, while other move of their own accord at constant velocity (dead reckoning). Other objects might not move at all, or may move because of an attachment to another moving object.

Often it is desirable to move the device without moving the controlled object, much like lifting the mouse when you have run out of mouse pad. Each transform has the capability to detach itself from its controlling axis so that it does not move with the device, but when it is reattached, it will move to the new position of this axis. To avoid this, the transformations can be based on position changes or deltas rather than positions. In this way, when the device is reattached, the transform will pick up where it left off when it was detached.

The simulation control (abbreviated SIM), monitors the objects in the world that are specified as avatars (moving objects), and determines if they are contacting any other objects in the scene. If so, contact forces are calculated and passed down the tree of transforms that position the avatar object (FIG. 21). Each of the transforms can then decide if it is attached to a device axis, in which case it would generate the appropriate force on that axis in accordance with haptic rendering.

Although all objects may be represented as polyhedrons, this is not the most efficient way to haptically render certain objects whose geometries are well defined and simple. To speed up the process of contact detection, a bounding box is placed around the object to more rapidly rule out distant objects. The defining parameters, as well as the contact detection method and the bounding box generation, is described below for a number of primitive objects. Some of these objects are shown in FIG. 22, along with indications as to relevant object description parameters.

Further elaboration of the haptic rendering process for each avatar may involve the following steps.

For each servo loop:

1. Compare the actual servo rate to the desired servo rate. Calculate the number of sub-loops that need to occur during the current servo loop in order to reach this desired rate. Using the beginning and ending axis data, compute the position deltas for each sub-loop.

In each sub-loop:

1. Update data for each object and transform.

For each avatar:

1. The position of the proposed god point gets assigned to be the avatar current location in absolute coordinates. The god point has no mass, so it will move all the way to the avatar if there are no obstacles.

For each object:

1. Check proposed god point against absolute bounding cube. Transform the proposed god point into the object's relative coordinate frame. Check against relative bounding box. If the current object is a polyhedron, check individual polygon bounding boxes.

If there is contact, separate deformable/non-deformable.

Non-Deforable: Construct a path from this object's god point to the current proposed god point. If this relative path crosses the object, remove the component of the path that is in the direction of the surface normal to get a new non-contacting path. Compute the new proposed god point as the object god point+non-contacting path. Store the surface normal so that other non-deformable contacts do not allow motion in this direction either. Alter motion of object and any objects connected to this one by springs. Transform proposed god point back to absolute coordinates.

Deformable: Construct a path from this object's god point to the avatar location. If the path crosses this object, remove the component of the path that is in the direction of the surface normal to get the path of the object god point. If there are other avatars touching this object, determine if the object god point for this avatar should be affected. If so, attract the object god point toward the other avatar. Deform the object based on vector from object god point to avatar.

Alter motion of object and any objects connected to this one by springs. Transform proposed god point back to absolute coordinates.

After all objects have been checked for god point contact, move the god point to the modified proposed god point. Update all non-deformable contacted objects' object god points by transforming the final god point into each one's relative coordinate frame.

Loop through all contacted objects. Compute the penetration delta between the avatar and the object god point. Calculate smooth surface vector, if required, by polyhedron smoothing.

Refer to next object in list.

Figure 23:
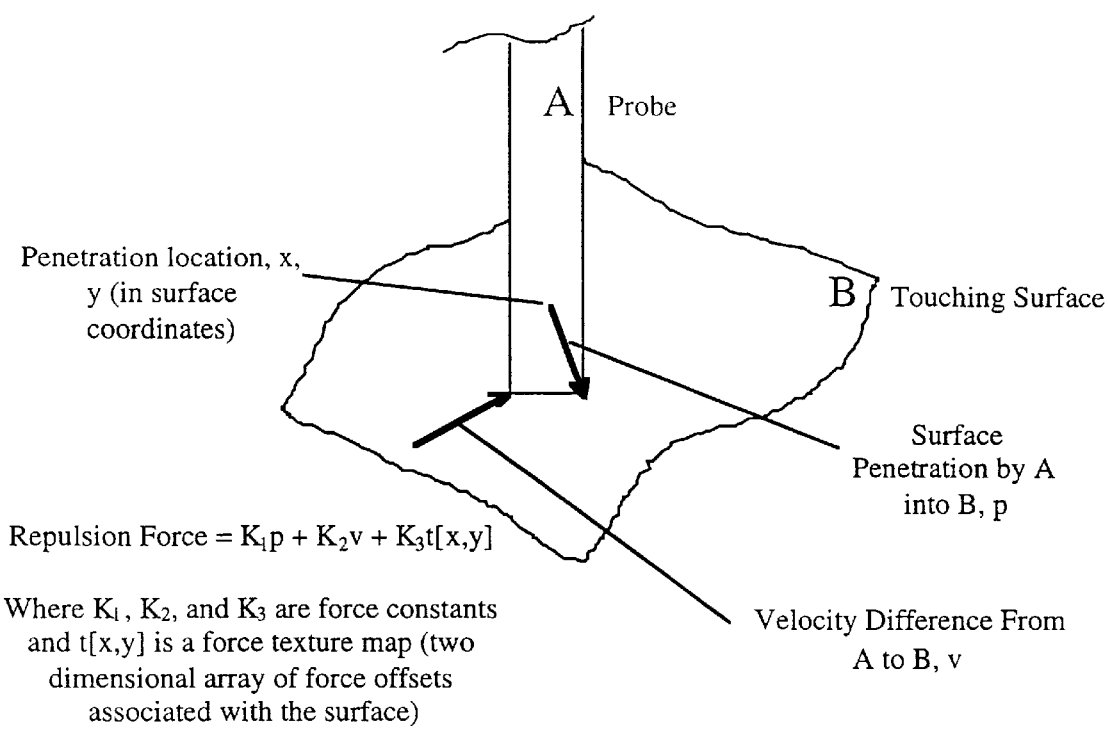
FIG. 23 is a drawing which illustrates force generation from object surface penetration.

Force between avatar and object god point will be determined by $K_1 p$ times the penetration delta and $K_2 v$ times the difference in their velocities. Add texture info to force vector (FIG. 23).

Repeat the procedure for the required number of sub-loops to complete the overall servo loop.

Apply the force at the avatar to the device.

BROWSER APPLICATION CHARACTERISTICS

Alternative applications layers may be used to perform various other functions, such as design, modeling, game simulation, three-dimensional exploration, etc. Regardless of function, access to the architecture is realized through calls to the APL layer(s) For a browser, this applications layer will typically consist of a database reading/parsing function (FIG. 3), a geometry instantiation function for static and dynamic entities, a simulation core for creating behaviors of dynamic entities, a rendering function for visual, haptic, and possibly sound entities, and a user(s) interactions function which allows the user to move freely within the virtual environment being browsed and potentially attach to one or more dynamic entities in the world.

The database reading function can acquire information from files local to a particular computer, as would be typical in browsing a 3D CAD/CAM file, or may acquire the input from over a network such as the Internet. In any case, the file or data will be coded in a standard geometrical file format, including DXF (AutoCAD exchange format); IGES or PDES (industry standard CAD/CAM formats); or VRML version 1.0 or 2.0 (exchange formats for geometrical data supplied over the World Wide Web). The parsing portion of the reader converts the file format into specific data items needed to be instantiated, or to hand-off data describing geometrical elements to the haptic rendering system previously described, or a visual rendering system such as Microsoft Direct3D or OpenGL from Silicon Graphics.

FIG. 5 shows a conceptual graphics file format including a hierarchical object description. Attached to each item is a property list describing item visual and haptic characteristics. The haptic browser differs from a normal visual browser in the inclusion of the haptic characteristics in these object description files.

If the VRML format is used, one data item allowed in the data format is a hyperlink or URL (FIG. 5). The URL allows logical connection to another VRML or HTML file located on the same computer or another somewhere else over the Internet on the World Wide Web. In this way, traversal of VRML URLs, which are attached as properties of specific objects in the virtual world, can effect traversal from location on the World Wide Web to another, as well as providing entry points into HTML text documents.

Figure 24:
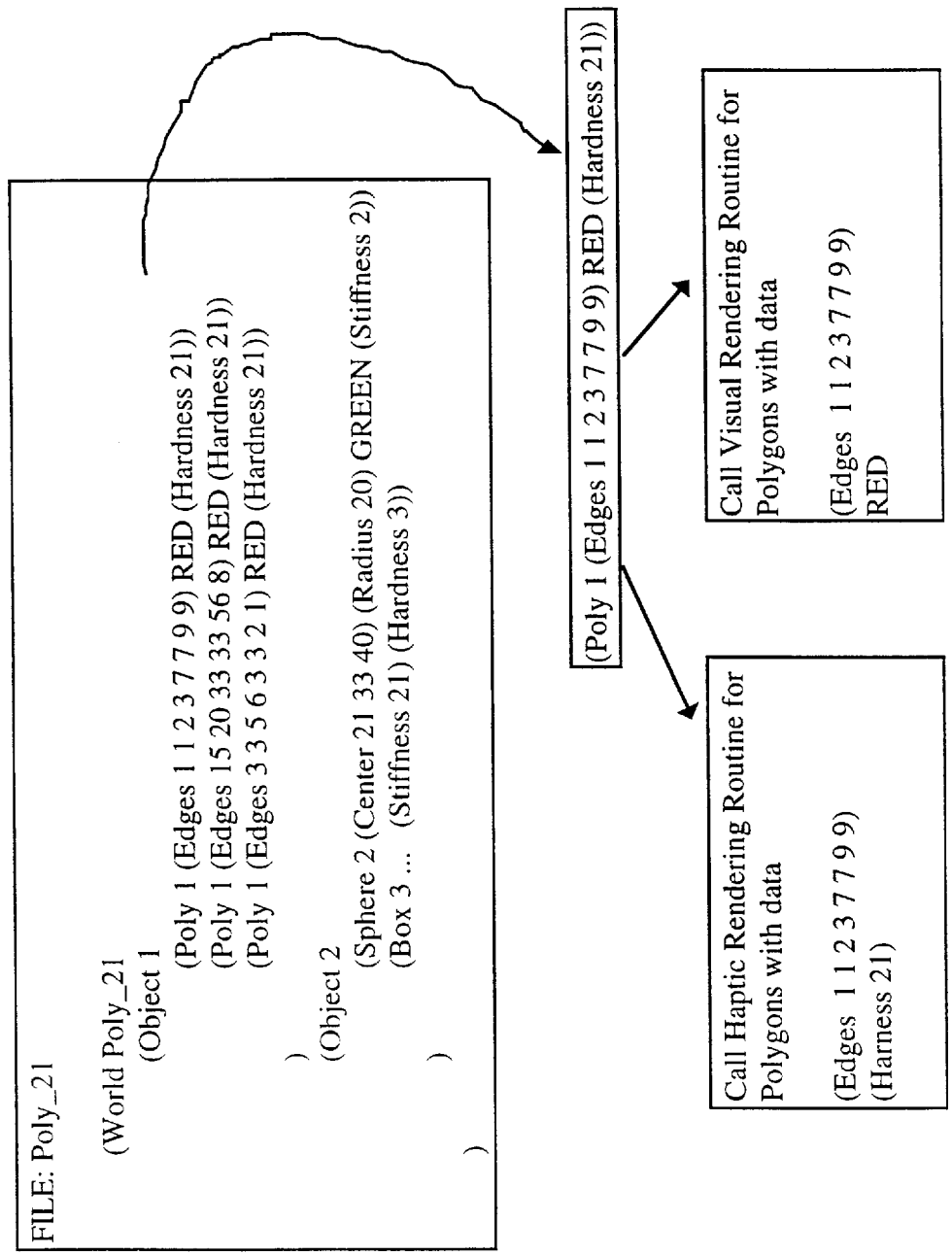
FIG. 24 is a drawing which shows data flow from an input file to an application programmer interface and rendering engine.
Figure 25:
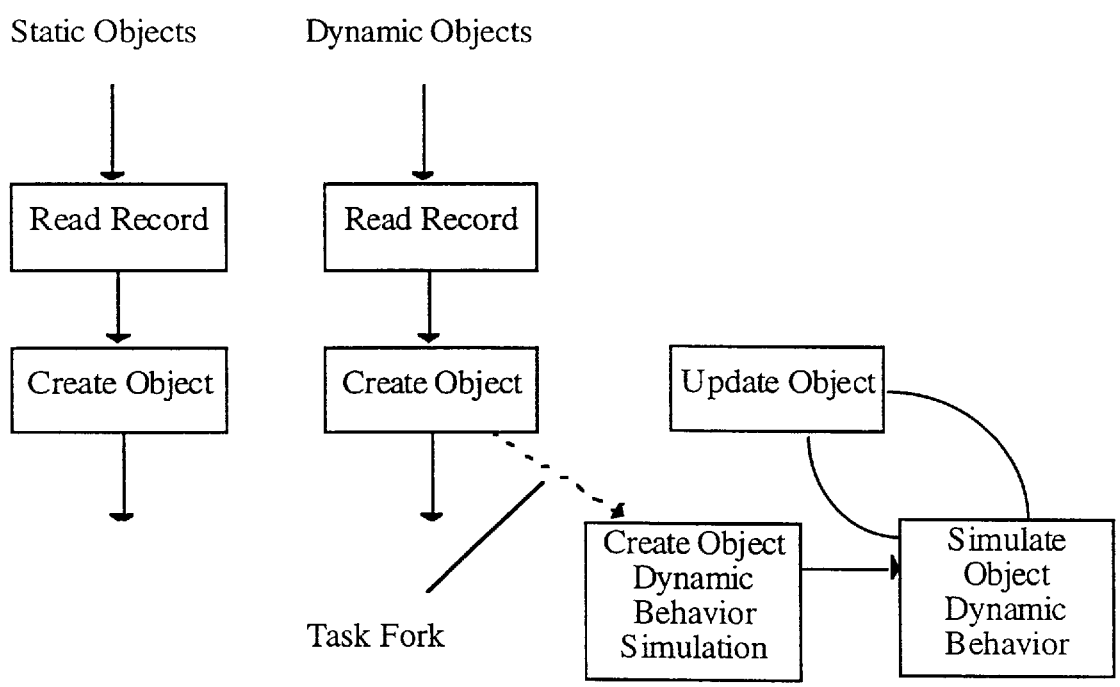
FIG. 25 is a diagram used to illustrate static versus dynamic entity processing.

The geometric instantiation portion consists of a code segment which takes values supplied by the parser and makes the application programmer interface calls (API) necessary to create the geometrical entities within the rendering systems, both haptic and visual (FIG. 24). For static, or non-moving entities the calls can be made once for efficiency when a new virtual world segment is being created. However, for each dynamic entity, new calls are needed for every movement of change to be created (FIG. 25).

These changes to dynamic objects are signaled by external message packets from other simulations in a distributed simulation environment, by interaction with the user through the haptic interface device, or by internal simulation code in the simulation core. Motion of dynamic objects requires a simulation evaluation system similar to that described in FIGS. 7–18. However, the results include changes in dynamic object parameters, rather than haptic device output forces. These changes can be manifest at haptic device force outputs if the haptic device is attached to a particular changing dynamic object. Similarly, this attachment process can allow direct control of the attached virtual object through motion of the haptic input device itself.

ADDITIONAL HAPTIC RENDERING AND BROWSER ISSUES

Each haptic browser file can stand alone or can include URL links which provide for the inclusion of entire haptic browser files from the same or other locations over a network like the World Wide Web. The browser file may include dynamic objects with attached simulation or behavior descriptions, as in VRML 2.0, or, as in VRML 1.0, may be totally static. The visual rendering of object components if performed in the conventional manner by visual rendering systems such as those included in Direct3D or OpenGL. However, the haptic rending component is accomplished using the data structures, methods, and procedures described in previous sections herein.

Figure 26:
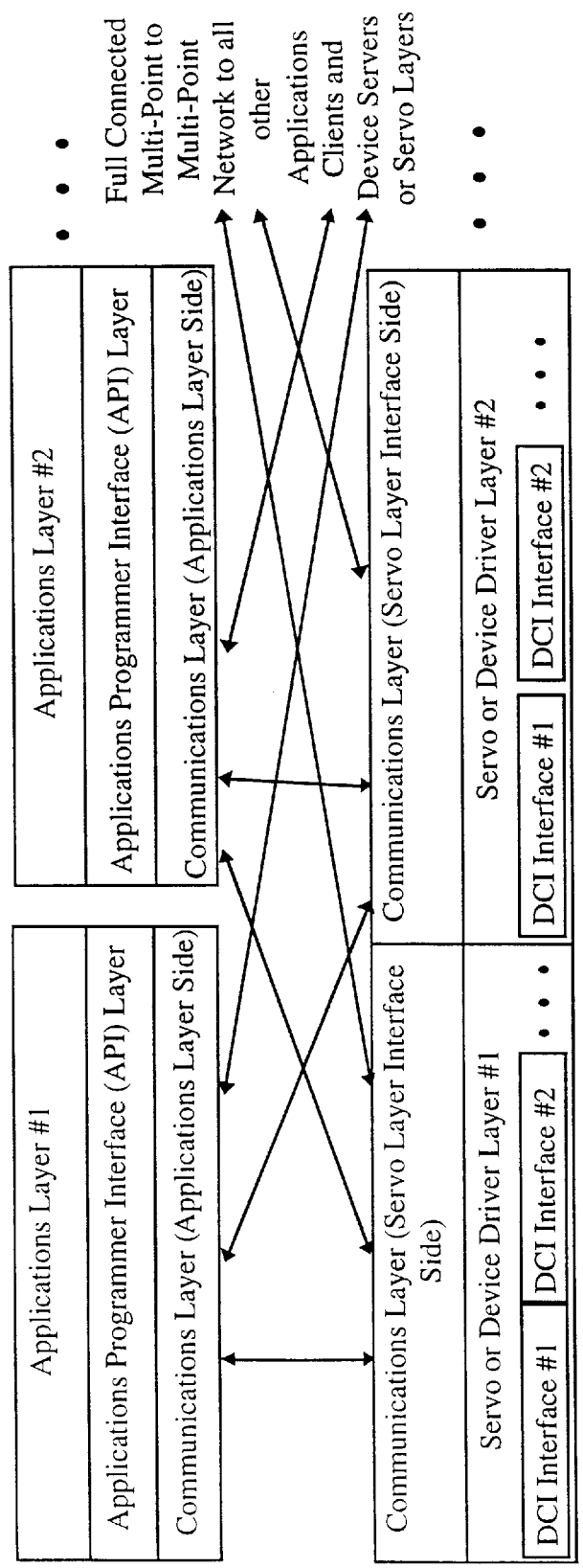
FIG. 26 shows multiple servo and device DCI layers within servo layers.

Note that each layer of the haptic rendering system can be placed in a different task segment on the same computer or, alternatively, in different computers connected through communications means. Some examples are provided in FIGS. 9–11. The communications layer can accommodate multiple lower level servo layers which are tailored to specific devices (FIG. 26). Within the servo layer multiple device types can be supported using multiple DCI hardware interface modules, specifically defined for each device type. At the API level, multiple lower level servo layers can be accessed through the communications layer. In addition, multiple applications and API layers can access a common device through their respective communications layers. Thus, the entire system can work from one or multiple computers, to one or multiple devices. These devices can have tightly servoed together as an integrated multiaxis device, or can be decoupled through the communications layer into separate devices.

Haptic device axis dimensionality is variable and control functions exist which can transform coordinate systems from applications layer to device layer, and back, so that the geometry or coordinate system of the system in the modeling application does not need to be the same as the geometry or coordinate system of the hardware interface device. This facility also allows for translation from virtual-world parameters to actual device parameters. Reference is made to FIG. 18, which depicts transform block locations.

Figure 27:
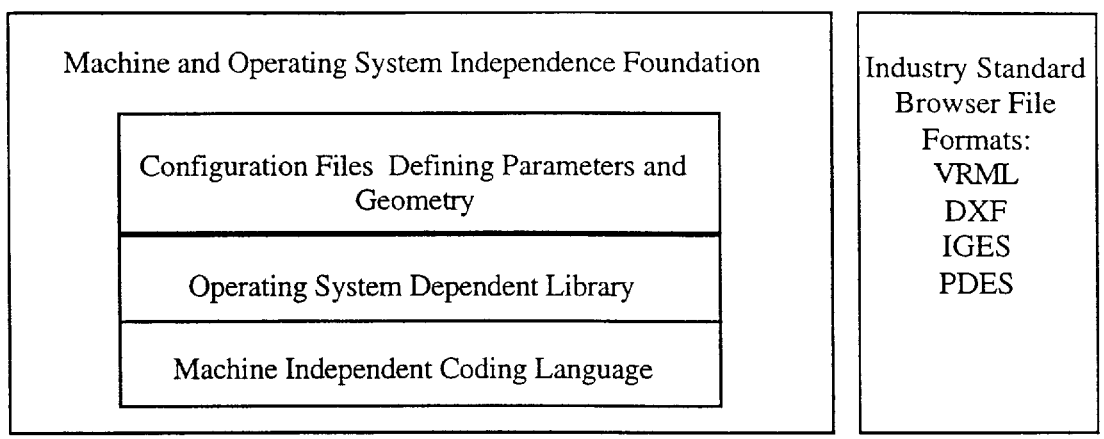
FIG. 27 illustrates operating systems and computer systems independence.
Figure 28:
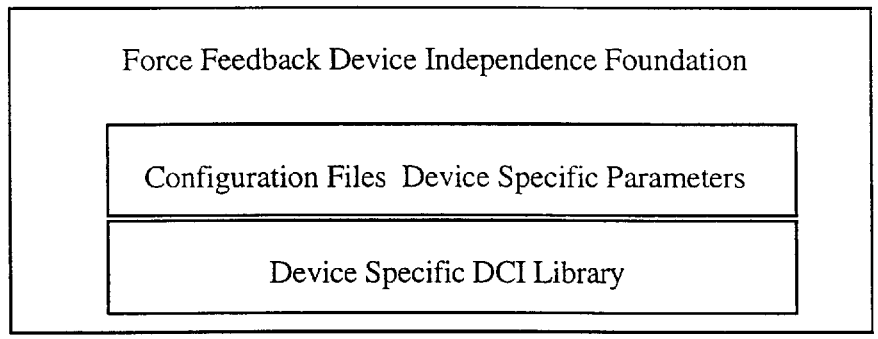
FIG. 28 illustrate device independence.

Operating system and computer independence may be achieved through several methods shown in FIG. 27. First is the use of a language for coding software which is available on each computer architecture supported, preferably C and C++. Tuning to the specific machine of algorithms may be accommodated through configuration files which define constants, pre-computed forces and force sequences, and device geometry/ characteristics. Operating system functions which differ or are not built-in are coded in the OS Dependent Functions library. There is one such library for each operating system (and/or computer) type which is supported. Furthermore, the graphics/haptics browser file formats can and, for the most part, are defined for manipulation by any computer type. File format definitions for VRML, DXF, IGES, and PDES are defined in a standard way across industry users. These policies allow for platform independent operations of the force feedback system. Force-feedback device independence is obtained by providing device specific configuration files and providing a set of DCI functions for each low-level device interface (FIG. 28).

We claim:

1. A method of haptic browsing, comprising the steps of:
providing a computer interfaced to a display device and a force-feedback controller;
accessing a file at the computer containing geometric object descriptions including attributes relating to touch; and
viewing an object on the display device while simultaneously haptically interacting with the object using the force-feedback controller.

2. The method of claim 1, wherein the file is stored at the location of the computer.

3. The method of claim 1, wherein the file is stored remotely, and wherein the step of accessing occurs over a network.

4. The method of claim 1, wherein the geometric object descriptions are in a standard graphics format.

5. The method of claim 1, further including the step of providing a layered architecture containing at least one servo layer interfaced to the force-feedback controller and at least one communications layer interfaced to one or more application layers.

6. The method of claim 5, further including one or more applications programmer interface layers (APIS) in communication with one or more force-feedback controllers.

7. The method of claim 6, wherein the force-feedback controllers are interfaced to one or more servo layers through multiple device control interface (DCI) levels.

8. The method of claim 5, wherein the layered architecture includes multiple servo and communications layers in support of one or more force-feedback controllers.

9. The method of claim 5, wherein at least one of the servo layers includes a plurality of control modules capable of exchanging parameters through a pipe construct.

10. The method of claim 5, wherein the parameters support device independence.

11. The method of claim 5, wherein at least one of the servo layers includes a plurality of control modules configured to produce superimposed force outputs.

12. The method of claim 5, wherein the interface to the force-feedback controller occurs through a serial port.

13. The method of claim 5, wherein the interface to he force-feedback controller occurs through a network sock.

14. The method of claim 5, wherein the interface to the force-feedback controller occurs through a shared memory.

15. The method of claim 5, further including a force-feedback information transfer protocol for messaging from one of more applications to one or more force feedback controllers through one or more intervening communications layers.

16. The method of claim 5, further including the step of executing one or more of the layers in parallel.

17. The method of claim 5, further including the step of providing a configuration file for a particular force-feedback controller providing coordinate and measurement transformations from the application layer through to the servo layer associated with that controller.

18. The method of claim 5, wherein the layered architecture is written in a machine-independent program description language.

19. The method of claim 5, further including the step of providing a computer and-operating system independent library associated with force-feedback control.

20. The method of claim 5, further including the step of providing a communications systems dependent library in support of communications systems independence.

* * * * *